US007756719B2

(12) United States Patent
Beck et al.

(10) Patent No.: US 7,756,719 B2
(45) Date of Patent: Jul. 13, 2010

(54) METHOD AND SYSTEM FOR TRACING THE IDENTITY OF AN AGRICULTURAL PRODUCT USING DATA HANDOFF

(75) Inventors: Andy Dwayne Beck, Urbandale, IA (US); Terence Daniel Pickett, Waukee, IA (US); Frederick William Nelson, Waukee, IA (US); Thomas Kent Wagner, Ankeny, IA (US)

(73) Assignee: Deere & Company, Moline, IL (US)

( * ) Notice: Subject to any disclaimer, the term of this patent is extended or adjusted under 35 U.S.C. 154(b) by 240 days.

(21) Appl. No.: 11/412,187

(22) Filed: Apr. 26, 2006

(65) Prior Publication Data

US 2006/0271555 A1 Nov. 30, 2006

Related U.S. Application Data

(63) Continuation of application No. 10/393,304, filed on Mar. 20, 2003, now Pat. No. 7,062,513, which is a continuation-in-part of application No. 10/327,277, filed on Dec. 20, 2002, now Pat. No. 6,671,698.

(60) Provisional application No. 60/366,181, filed on Mar. 20, 2002.

(51) Int. Cl.
*G06Q 30/00* (2006.01)
*G06Q 10/00* (2006.01)
*G06F 7/00* (2006.01)

(52) U.S. Cl. .............................. 705/1; 705/28; 705/400; 707/608

(58) Field of Classification Search ....................... None
See application file for complete search history.

(56) References Cited

U.S. PATENT DOCUMENTS

| 5,478,990 | A | | 12/1995 | Montanari et al. .......... 235/375 |
|---|---|---|---|---|
| 5,845,229 | A | | 12/1998 | Rawlins .......................... 702/2 |
| 5,991,687 | A | * | 11/1999 | Hale et al. ................... 701/207 |
| 6,016,713 | A | * | 1/2000 | Hale ........................ 73/864.45 |
| 6,119,531 | A | | 9/2000 | Wendte et al. ............ 73/863.52 |
| 6,211,789 | B1 | | 4/2001 | Oldham et al. ............ 340/573.3 |
| 6,231,435 | B1 | | 5/2001 | Pilger .......................... 452/157 |
| 6,327,569 | B1 | | 12/2001 | Reep .............................. 705/1 |

(Continued)

FOREIGN PATENT DOCUMENTS

FR 2 776 790 9/1999

(Continued)

*Primary Examiner*—Neveen Abel Jalil
*Assistant Examiner*—Tarek Chbouki

(57) ABSTRACT

Initial data is acquired on an agricultural product associated with a harvesting time. The acquired initial data is transmitted (e.g., handed off) via an electromagnetic signal or wireless communication to an intermediate data processing system associated with a handler of the agricultural product. Additional data is appended to the acquired initial data received at the intermediate data processing system to form composite data. The composite data is transmitted via an electromagnetic signal or wireless communication to at least one of a receiver and a data processing system for processing or storing the composite data. The composite data is transferred to or made available to a data management system, which may be accessible to one or more users who seek access to at least one of the initial data, the additional data, and the composite data on the agricultural product or a derivative thereof.

20 Claims, 11 Drawing Sheets

U.S. PATENT DOCUMENTS

| | | | |
|---|---|---|---|
| 6,329,920 B1 | 12/2001 | Morrison et al. | 340/573.3 |
| 6,342,839 B1 | 1/2002 | Curkendall et al. | 340/573.3 |
| 6,346,885 B1 | 2/2002 | Curkendall et al. | 340/572.4 |
| 6,385,544 B1 | 5/2002 | Mafra-Neto | 702/5 |
| 6,493,723 B1* | 12/2002 | Busche | 707/104.1 |
| 6,796,504 B2* | 9/2004 | Robinson | 235/462.13 |
| 7,440,901 B1* | 10/2008 | Dlott et al. | 705/1 |
| 2001/0011437 A1 | 8/2001 | Shortridge et al. | 47/58.1 |
| 2001/0029996 A1 | 10/2001 | Robinson | 141/11 |
| 2001/0051905 A1* | 12/2001 | Lucas | 705/29 |
| 2001/0054009 A1* | 12/2001 | Miller et al. | 705/26 |
| 2002/0012934 A1 | 1/2002 | Meghan et al. | 435/6 |
| 2002/0032497 A1 | 3/2002 | Jorgenson et al. | 700/115 |
| 2002/0082982 A1 | 6/2002 | Mock et al. | 705/37 |
| 2002/0091593 A1 | 7/2002 | Fowler | 705/28 |
| 2002/0095232 A1 | 7/2002 | Jorgenson et al. | 700/99 |
| 2003/0033224 A1* | 2/2003 | Ludwig et al. | 705/28 |
| 2003/0221118 A1* | 11/2003 | Walker | 713/193 |
| 2004/0024782 A1 | 2/2004 | Chamberlain | 707/104.1 |
| 2004/0128045 A1* | 7/2004 | Benneweis | 701/50 |
| 2006/0281435 A1* | 12/2006 | Shearer et al. | 455/343.1 |
| 2006/0287783 A1* | 12/2006 | Walker | 701/29 |
| 2007/0061360 A1* | 3/2007 | Holcombe et al. | 707/103 R |
| 2007/0189921 A1* | 8/2007 | Duong et al. | 422/58 |
| 2007/0219916 A1* | 9/2007 | Lucas | 705/58 |
| 2008/0052320 A1* | 2/2008 | Lee et al. | 707/104.1 |

FOREIGN PATENT DOCUMENTS

| | | |
|---|---|---|
| FR | 2 813 683 A1 | 3/2002 |
| FR | 2 836 257 | 8/2003 |
| WO | 00/48454 | 8/2000 |
| WO | 01/93036 A1 | 12/2001 |
| WO | 02/13594 A1 | 2/2002 |
| WO | 02/37375 A1 | 5/2002 |
| WO | 03/058404 A2 | 7/2003 |

* cited by examiner

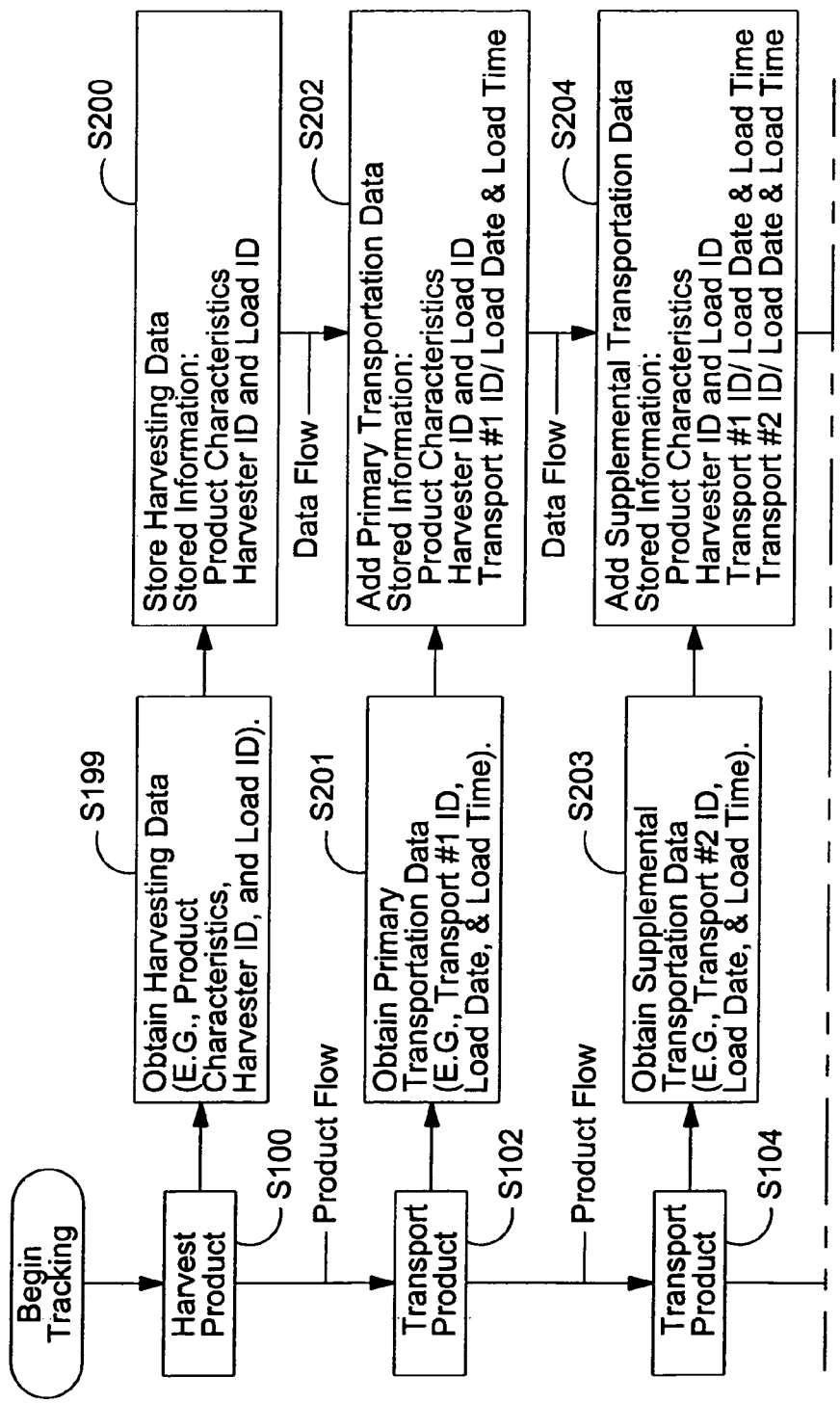

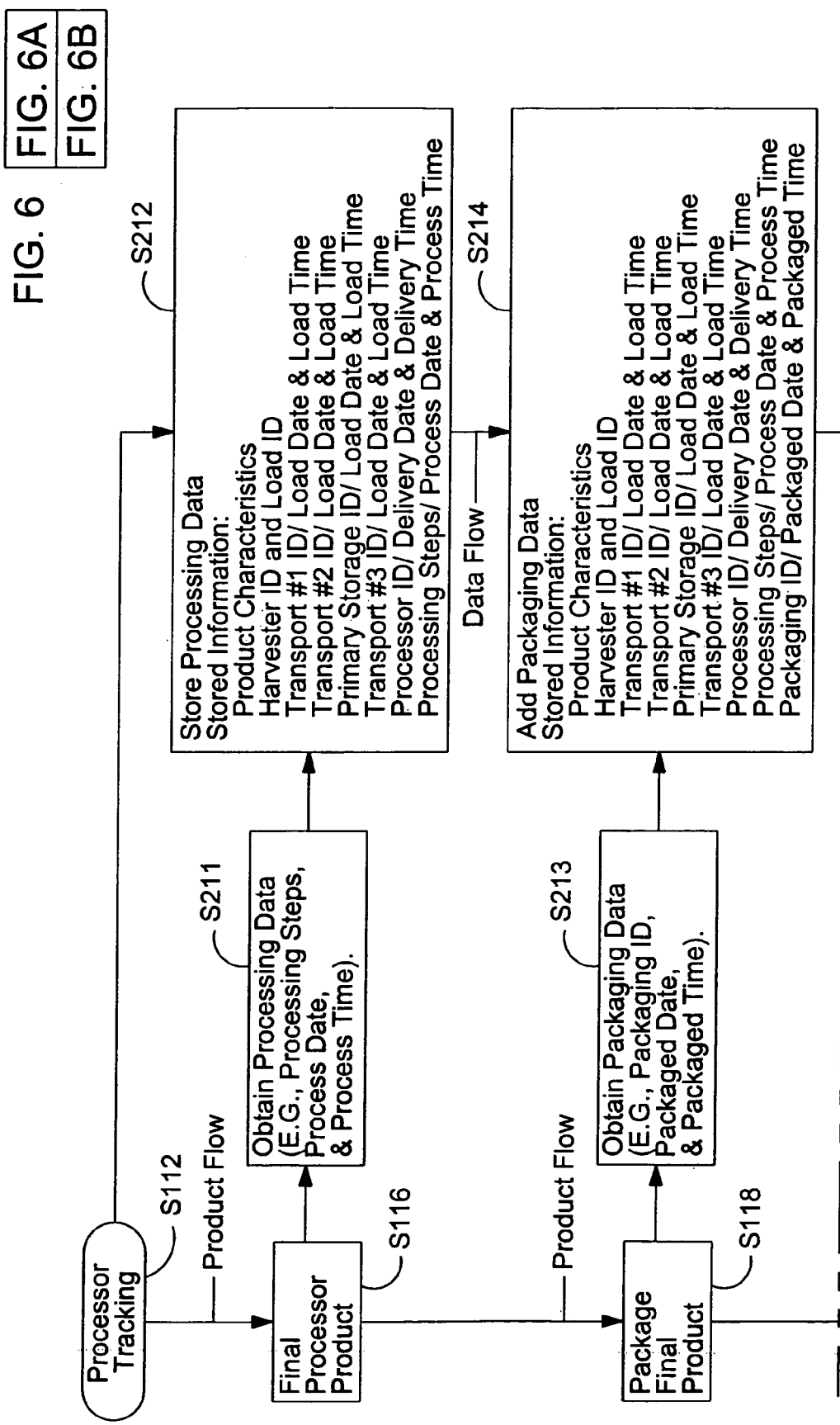

US 7,756,719 B2

METHOD AND SYSTEM FOR TRACING THE IDENTITY OF AN AGRICULTURAL PRODUCT USING DATA HANDOFF

This is a continuation of application Ser. No. 10/393,304, filed Mar. 20, 2003, now U.S. Pat. No. 7,062,513 which is a continuation-in-part application of U.S. application Ser. No. 10/327,277, filed on Dec. 20, 2002, now U.S. Pat. No. 6,671, 698, which claims the benefit of U.S. Provisional Application No. 60/366,181, filed Mar. 20, 2002; and this application is entitled to the benefit of the foregoing prior applications under 35 U.S.C. 119(e) and 35 U.S.C. 120.

FIELD OF THE INVENTION

The invention relates to a method and system for tracing the identity of an agricultural product.

BACKGROUND OF THE INVENTION

Agricultural products may include horticultural crops and livestock. Livestock includes animals that are raised for food and for other products. Horticultural crops may be classified as edible crops, inedible crops, pharmaceutical crops, genetically engineered crops, genetically modified organisms (GMOs), non-GMOs, organic, pesticide-free or in accordance with other crop attributes. Inedible crops may include crops such as fiber, cotton or rubber, for example. Genetically modified crops may include vegetables that are genetically manipulated to hold their shelf life longer than traditionally cultivated vegetables. Pharmaceutical crops may include plants or crops that are genetically engineered to produce or contain novel proteins, monoclonal antibodies, other compounds or precursors thereto with biologically active or pharmacological properties for the treatment of disease in humans and/or animals. Organic crops are harvested from plants that are grown without exposure to certain pesticides, herbicides or other chemicals.

Crops may be grown to specific crop attributes or specifications. Crop attributes may be based on the genetic composition of a crop, the growing practices for a crop or both. For example, a certain variety of corn may be grown that has a greater oil content than other varieties because of genetic or environmental factors. Similarly, a certain variety of soybeans may be grown that has a different protein content or other crop attribute that is desirable. A processor, a pharmaceutical company, a manufacturer or another concern may desire to purchase agricultural products with specific crop attributes from a grower or another supplier. The grower or supplier wishes to charge a premium for crops with specific crop attributes compared to a commodity-type crop. The purchaser of the agricultural product desires sufficient assurance that the agricultural product that is being purchased actually possesses the crop attributes that are sought.

However, in the U.S., some prevalent crop production and distribution practices are not generally amenable to providing sufficient assurance to the purchaser of crops with specific crop attributes. Presently, many of the different varieties of horticultural crops are stored in large storage bins at grain elevators, and different varieties are often mixed together, purposely or unintentionally, at grain elevators or in other storage systems. The various classifications of grains, vegetables, and fruits are often based on general U.S. Department of Agriculture (USDA) guidelines that rate the crops based on appearance and quality, as opposed to specific crop attributes (e.g., genetically modified attributes). Therefore, the mixing of different varieties of crops, or crops from different growers, has been a widely accepted practice in the U.S. that predates the advent of various novel genetically engineered attributes of crops.

Traditionally, many horticultural crops have been regarded as commodities in which one crop or plant has been regarded the same or equivalent as any other of the same general type. However, because of technological advances, crops may be differentiated by growing practices, genetic attributes, and other specifications. A particular agricultural product with a first attribute must be segregated to preserve its identity or to prevent contamination from another agricultural product with a second attribute, where the first and second attributes are incompatible or inconsistent with the contractual terms of a grower contract or sale of the agricultural product. Thus, a need exists to accurately identity crops with specific crop attributes throughout the growing, distribution, and production of crops and any products derived therefrom. Further, a purchaser of an agricultural product or a crop may desire or demand the ability to trace the identity of the crop with specific crop attributes to verify the presence of the crop attributes as a condition for a commercial transaction.

SUMMARY OF THE INVENTION

In accordance with the invention, a method and system for tracing the identity of an agricultural product comprises acquiring initial data on an agricultural product associated with a harvesting time. The acquired initial data is transmitted (e.g., handed off) via an electromagnetic signal or wireless communication to an intermediate data processing system associated with a handler of the agricultural product. Additional data is appended to the acquired initial data received at the intermediate data processing system to form composite data. The composite data is transmitted via an electromagnetic signal or wireless communication to at least one of a receiver and a data processing system for processing or storing the composite data. The composite data is transferred to or made available to a data management system, which may be accessible to one or more users who seek access to at least one of the initial data, the additional data, and the composite data on the agricultural product or a derivative thereof.

DESCRIPTION OF THE PREFERRED EMBODIMENT

Figure 1:
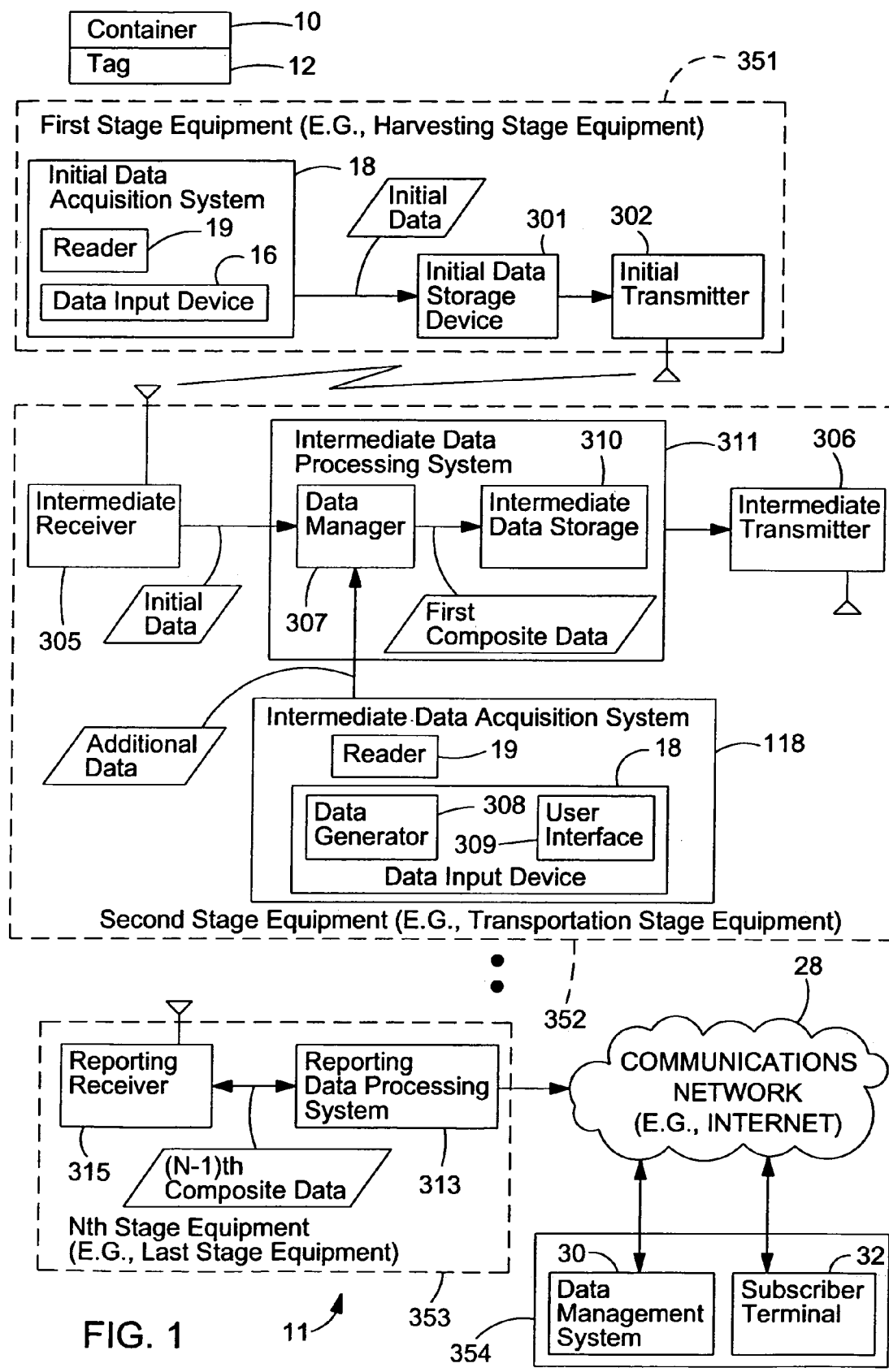
FIG. 1 is a block diagram of a tracking system for tracking the identity of an agricultural product.

An agricultural product includes, but is not limited to, a crop, a derivative of a crop, an extract from a crop, an intermediate product, and a final product. A crop may include, but is not limited to, any of the following: an organic crop, an organically grown vegetable, an organically grown fruit, number two yellow corn, high oil corn, high starch corn, waxy corn, highly fermentable corn, white corn, nutritionally-enhanced corn, pest-resistant corn, corn resistant to corn earworms, herbicide resistant corn, non-genetically modified corn, and genetically modified corn, corn with genetically altered protein content, corn with genetically altered enzyme content, high protein soybeans, high oil soybeans, large soybeans, non-genetically modified soybeans and genetically modified soybeans, and any other crop attributes.

A product-flow description may comprise one or more of the following: chain of custody of an agricultural product or a derivative thereof, a list of successive custodians of an agricultural product or a derivative thereof, a historical travel path of the agricultural product or a derivative thereof, a list of successive locations of the agricultural product between an origination location and a destination location, and a product flow map. The product flow map may be represented in textual, graphical, tabular or another format.

Crop information or crop data includes, but is not limited to, genetic data and production data on a crop or an agricultural product. Production information may include any of the following: pre-planting information, planting information, growing information, adjacent-field information, adjacent crop information, harvesting information, chemical application information, weather information, and location data.

The location data may be associated with other corresponding production information to provide location data versus planting information, location data versus growing information, location data versus chemical application information, location data versus adjacent field information, location data versus adjacent crop information, and location data versus weather information. The location data and other corresponding production information may be stored in data storage or computer memory in the form of a look-up table, a relational database or otherwise.

The pre-planting information relates to any of the following: historical planting information, historical growing information, historical harvesting information, and historical chemical application information. Further, the pre-planting information may, but need not, relate to the genetic data on the seeds or plant life. The planting information includes information such as the seed variety, the seed source, the location where the seed is planted, the date planted, soil condition, soil factor values, settings of the planting machinery and any chemicals applied at the time of planting, and other agronomic factors. The seed variety information can be obtained from the seed supplier, supplier invoice, receipt, documentation, seed contract, the seed bag or another container in which the seed is delivered.

The growing information on growing of the crop may be collected during the growing of the crop. The growing information may include one or more of the following: chemical data, fertilizer data, nutrient data, pesticide data, herbicide data, fungicide data, irrigation data, water data, temperature data, sunlight data, growing degree day data; rate of application of at least one of a chemical, fertilizer, nutrient, pesticide, herbicide, fungicide, water or another crop input; and rate of application versus location of application of a least one of a chemical, fertilizer, nutrient, pesticide, herbicide, fungicide, water or another crop input. The weather information may include daily temperature, daily precipitation, weekly temperature, weekly precipitation, or temperature or precipitation for other time periods, for example.

Harvesting information includes information such as the harvesting date, the harvesting location, yield of the harvested particular crop, moisture content of the harvested particular crop, the physical condition of the harvested particular crop, various settings of the harvesting machinery or machine, a measure of a particular trait or characteristic of the crop, and a storage identifier of one or more storage volumes into which the harvested particular crop is or was loaded. If a data profile contains different classifications (e.g., planting information, growing information, harvesting information, chemical application information, and weather information) of crop data or a combination of production information, processing information, and manufacturing information, the data profile may be referred to as a collective data profile or a data profile.

Chemical information may include an identity of a chemical, identity of a compound, identity of a formulation or treatment, fertilizer data, insecticide data, herbicide data, a rate of application of the chemical, a concentration of the chemical, a manufacturer of the chemical, the solubility of the chemical, a measure of acidity or alkalinity of the chemical or other chemical-related information. One or more chemicals or compounds may be applied before, after or during the planting of a particular crop or a precursor to the particular crop.

A data profile may represent a description or definition of a particular crop, a derivative product derived from the particular crop or a final product derived from the particular crop. The data profile may have a temporal component (e.g., growing season or time span associated with the particular crop), a geographic component (e.g., a planting location and harvesting location of the particular crop), and a descriptive component (e.g., a characteristic of the particular crop).

As used herein, a storage volume or segregated storage means may comprise any of the following: a container, an inter-modal freight container, a segregated storage bin, a segregated storage bin of a grain elevator, and any other fixed or mobile container for holding a crop or agricultural product.

In one embodiment, the crop tracing method and system of the present invention traces the agricultural product or derivative thereof during and after agricultural production. The agricultural production may include any of the following agricultural activities and associated production information: the planting of seed, vegetation or plant-life, the harvesting of the mature crop, chemical application before or after planting, weather information during the growing season, mechanical soil treatment, and other agronomic inputs. Initial data may include, but need not include, any agricultural production information associated with the agricultural product that is provided by, or on behalf of, the producer or grower. That is, initial data may incorporate one or more of the following agricultural production information: pre-planting information, planting information, growing information, adjacent-field information, adjacent crop information, harvesting information, chemical application information, weather information, and location data.

After agricultural production, the agricultural product may be transported, stored, treated, delivered, processed or otherwise handled by one or more members of a supply chain between a producer of the agricultural product or a derivative thereof and a consumer, user or potential recipient of the agricultural product or a derivative thereof. Additional data or ancillary data includes any data that may supplement or be added to the initial data associated with the agricultural product or any derivative thereof. The additional data or ancillary data may relate to handling of the agricultural product or any derivative product to establish a product flow description for a person, business entity, user or potential recipient of the agricultural product or derivative product. The combination of initial data and additional data is designated composite data or a data profile. In one embodiment, the composite data is associated with a storage identifier of each storage volume (e.g., container) into which the crop is placed.

The composite data and the associated storage identifier (e.g., container identifier) are maintained in a data storage device or in a database. Any initial data, additional data, composite data or data profile may be stored locally at, or in proximity to, its source of origination, which is physically discrete from a centrally stored data in a central database until the locally stored data is handed-off to or through one or more stages or otherwise migrates to the central database (e.g., a data management system 30). For example, the database can be maintained by a producer at the farm office, by an information service provider or by both the producer and the information service provider. An information service provider (or holder of data profiles) operates a data service (e.g., a web site) accessible via a communications network (e.g., the Internet) or otherwise to enable information to be easily transferred to the information service provider and accessed by others (e.g., downstream supply-chain members or consumers). The producer (i.e., grower) can use at least one of the initial data, the additional data, ancillary data, and the composite data to market or sell the crop and can also deliver any of the initial data, the ancillary data, additional data, and the composite data to a purchaser of the crop or to downstream users of the crop so the users can obtain an agricultural product with verification and/or a high degree of confidence that a desired differentiated attribute is present.

In accordance with FIG. 1, the system 11 for tracing the identity of an agricultural product, may have electronics equipment associated with one or more stages, including a first stage through an Nth stage, where N equals any whole number greater than or equal to two. In one example, the first stage represents the harvesting stage; the second stage represents the transportation stage; and the third stage represents the storage stage or a processing stage for an agricultural crop or a derivative thereof. A container 10 may hold the agricultural product or a derivative thereof for one or more of the stages. The container 10 is associated with a tag, which may be readable by electromagnetic radiation (e.g., optical, radio-frequency or infra-red signals).

In the illustrative embodiment of FIG. 1, first stage equipment 351 through Nth stage equipment 353 is shown, where N is any whole number greater or equal to two and where N represents the total number of equipment stages. Handling equipment shall refer to any of the first stage equipment 351, the second stage equipment 352, Nth stage equipment 353, and other equipment that is used in transporting, processing, storing or managing the flow, supply chain or logistics of the agricultural product or a derivative thereof. The data associated with an agricultural product or a derivative thereof may be transferred (e.g., passed or handed-off) between handling equipment and cumulatively stored locally in handling equipment until transferred to the data management system 30 at a central location.

The first stage equipment 351 may be associated with a harvesting site of the agricultural crop. For example, the first stage equipment 351 may be integrated into, or associated with, a harvester, a combine or another agricultural machine for harvesting the agricultural crop. The second stage equipment 352 may be associated with transportation of the agricultural crop or a derivative thereof from the harvesting site to another location. For example, the second stage equipment 352 may be integrated into, or associated with, a vehicle, a truck, a trailer, a cart, a ship, a barge, vehicle, grain cart, an aircraft or another transportation device for moving the agricultural product or a derivative thereof. The Nth stage equipment 353 may be, but need not be, associated with storage of the agricultural product or a derivative thereof at a storage location.

In FIG. 1, the first stage equipment 351 comprises an initial data acquisition system 18 coupled to an initial data storage device 301. In turn, the initial data storage device 301 is coupled to an initial transmitter 302. The initial data acquisition system 18 comprises a reader 19 and a data input device 16. The data input device 16 may represent a data generator, a user interface, or both. The initial transmitter 302 communicates with an intermediate receiver 305 of the second stage equipment 352 via an electromagnetic signal (e.g., a radio frequency signal).

The second stage equipment 352 comprises an intermediate receiver 305 coupled to an intermediate data processing system 311. Further, an intermediate data acquisition system 118 feeds additional data to the intermediate data processing system 311. The intermediate data processing system 311 is coupled to an intermediate transmitter 306.

The intermediate data acquisition system 118 comprises a reader 19 for reading the tag 12 and a data input device 16. The data input device 16 includes a user interface 309 and a data generator 308. The user interface 309 refers to a keypad, a keyboard, a graphical user interface 309 or another device for data entry or input. The data generator 308 may generate additional data based on preset rules (e.g., a user profile) or program instructions. For example, when a user reads a tag, the selected set of additional data may be generated based on a user profile of the user. In one embodiment, the data generator 308 comprises a global positioning device or Global Positioning System (GPS) receiver that provides location data and corresponding temporal data for the position of the GPS receiver.

The intermediate data processing system 311 comprises an intermediate data storage device 310 and a data manager 307. The intermediate data storage device 310 is capable of receiving, storing, and holding initial data acquired by the data acquisition system 18 and forwarded to the intermediate receiver 305. Further, the intermediate data storage device 310 is capable of storing and holding additional data provided to the data manager 307 by the intermediate data acquisition system 118. In one embodiment, the data manager 307 comprises an appender for appending additional data (from the intermediate data acquisition system 118) to the initial data (from the initial data acquisition system 18) to form first composite data.

Additional stages of equipment may be present between the second stage equipment 352 and the Nth stage equipment 353 as indicated by the two dots in FIG. 1. For example, the additional stages of equipment may support additional transportation, storage, treatment, commercial, manufacturing, extraction, transformation or other activities associated with the agricultural product or derivatives thereof.

The Nth stage equipment 353 comprises a reporting receiver 315 coupled to a reporting data processing system 313. In turn, the reporting data processing system 313 may be coupled to a communications network 28. The communications network 28 may support communications between the reporting data processing system 313 and a data management system 30 (e.g., database management system).

The reporting data processing system 313 transmits the additional data and initial data (e.g., the container data, such as a container identifier) via a communications network 28 (e.g., the Internet) to a data management system 30. In one embodiment, the initial data and additional data may be arranged together as composite data (e.g., Mth composite data, where N is the total number of stages and M=N−1) for a transmission to the data management system 30 and storage in the data management system 30. For example, if N equals 5, the composite data could be designated as a fourth composite data.

The information and retrieval equipment 354 comprises a data management system 30 for storing information related to an agricultural crop or a derivative thereof, where the information is obtained by at least one of the first stage equipment 351, the second stage equipment 352, and the Nth stage equipment 353. The subscriber terminal 32 facilitates access to the stored information via the communications network 28 or otherwise. The information retrieval equipment 354 supports retrieval of data collected during at least one of the first stage through the Nth stage. Any of the stages may represent a harvesting stage, a transportation stage, a storage stage, and a processing stage, for example.

The system 11 of FIG. 1 for tracing the identity of an agricultural product may work in conjunction with a container 10 and a tag 12. The container 10 holds an agricultural product or a derivative thereof. The tag 12 may be configured in accordance with various alternate configurations. In accordance with the first configuration, the tag 12 comprises a radio frequency tag (e.g., a commercially-available radio frequency tag. An illustrative radio frequency tag is available from Amtech or Transcore as model number AT5510. In accordance with a second configuration of the invention, the tag 12 comprises an optically readable code, such as a bar code label or a Universal Product Code (UPC) label. The optically readable code may be printed or otherwise placed on a sticker or label. In accordance with a third configuration of the invention, the tag 12 may comprise an electronic tag that is activated upon receipt of a particular code carried on an electromagnetic signal or a particular modulation (e.g., a transmitted code) of the electromagnetic signal.

The reader 19 is adapted to read the tag 12 and is compatible with any of the above configurations or the requisite technology for reading the tag 12. An illustrative reader 19 is available from Amtech or Transcore as an AI1611 SmartPass reader 19. SmartPass is a trademark of TC IP, Ltd. The tag 12 may contain specific information about the container 10 which may be referred to as container data. The container data may comprise one or more of the following: the volume of the container 10, container dimensions, container width, container height, container depth, container weight, container tare weight, container volumetric capacity, container refrigeration data, container environmental or climate-control data, and a container identifier. The reader 19 is capable of reading the tag 12 to determine the container data (e.g., container identifier) stored in the tag 12 or otherwise associated with the tag 12.

Returning to the first stage equipment 351, the data acquisition system 18 may be associated with a tractor, a combine, a harvester or another agricultural machine. The data input device 16 of the initial data acquisition system 18 supports the acquisition of initial data. Initial data may include, but is not limited to, harvesting data, genetic information, location data, crop inputs versus location data, production information, production information versus location data, moisture data, yield data, and other information about an agricultural crop. The initial data acquisition system 18 and one or more data processing systems (311, 313) may be integrated into equipment or machines including one or more of the following: grain cart, tractor, truck, semi-truck, a grain elevator, a storage bin, a product loading mechanism or the like.

Referring to the second stage equipment 352, the intermediate data acquisition system 118 gathers additional data on the agricultural product or a derivative thereof. The additional data includes, but is not limited to, transportation data, handling data, shipment data, storage data, processing data, and attribute data associated with the agricultural crop or a derivative thereof.

The data management system 30 may comprise a distributed database system, a centralized database management system or another data storage system. The distributed data management system may involve a communicating group (e.g., a network) of computers that cooperate to store and retrieve particular components of an entire database or particular records of an entire database. During a request, search or data retrieval, a master computer or main server may query secondary or child servers for information. Multiple servers or computers may service a request in a cooperative manner under the direction of the master computer or main server.

A centralized database may use one or more servers or data processing systems to store a database. The data storage of the data management system 30 may contain initial data, additional data and composite data. The additional data may include temporal data that defines the container data, initial data, or both. The temporal data component may include one or more of the following: a respective reading time or date for additional data, an input time or date for the additional data, or a respective reading time or date for container data. The data acquisition system (18 or 118) or a component thereof (e.g., a reader 19 or data input device 16) may have a clock or a time stamp module for providing the temporal data based upon a reading time.

As illustrated in FIG. 1, the data storage (301, 310) of each successive stage stores more and more information. The information stored in the data storage of a preceding stage may be a subset of the information from one or more later stages.

The transmitter (e.g., initial transmitter 302) of an earlier stage communicates with a receiver (e.g., intermediate receiver 305) of a later adjacent stage. For example, the intermediate receiver 305 receives the data message from the earlier stage and the a data manager 307 adds additional data to the initial data or some iteration of composite data (e.g., a first composite data through N−1 composite data) to form composite data. The intermediate stages include any and all stages from the second stage to the N−1 stage where N equals a whole number greater than or equal to two and where the Nth stage is the last stage. Each intermediate stage may comprise an intermediate receiver 305, an intermediate data processing system 311, an intermediate data acquisition system 118, an intermediate data storage unit 310, and an intermediate transmitter 306. The composite data is then transmitted via the intermediate transmitter 306 to the next stage, until the last stage (e.g., the Nth stage equipment 353) is reached.

In an illustrative example, the first stage may represent the harvesting of an agricultural product; the second stage may represent the transfer of the agricultural product into a cart (e.g., a grain cart); the third stage may represent the transfer to the agricultural product from the cart into a bin at a grain elevator or another storage location; the fourth stage may represent the transfer of an agricultural product from a the storage location to a shipper (e.g., via a semi-truck); the fifth stage may represent a main processor (e.g., a mill); and the sixth stage may represent shipping of the agricultural product (e.g., wheat) or a derivative thereof (e.g., flour) to a retailer (e.g., a grocer). The product flow map facilitates tracking the agricultural product to meet delivery dates and verifying the integrity of the content of agricultural product. The integrity of the agricultural product may be based on the likelihood of contamination by an evaluation of the handlers and periodic evaluation of the handlers, to provide a handler rating system.

In one illustrative example, the initial data, additional data, and composite data comprises product information. The product information on the agricultural product, and/or any derivative thereof, may be transferred between handling equipment associated with each stage and cumulatively stored in one stage at least until transferred to the next successive stage. At any reporting stage, which may be defined by a user, as a last stage or any other stage or stages, the data processing system may report the cumulatively stored information to a data management system 30 via a communications network 28 or otherwise.

The data management system 30 or the reporting data processing system establishes a report or provides reportable data on a product flow description of the agricultural product. A product-flow description may comprise one or more of the following: chain of custody of an agricultural product or a derivative thereof, a list of successive custodians of an agricultural product or a derivative thereof, a historical travel path of the agricultural product or a derivative thereof, a list of successive locations of the agricultural product between an origination location and a destination location, and a product flow map. The product flow map may be represented in textual, graphical, tabular or another format.

Figure 2:
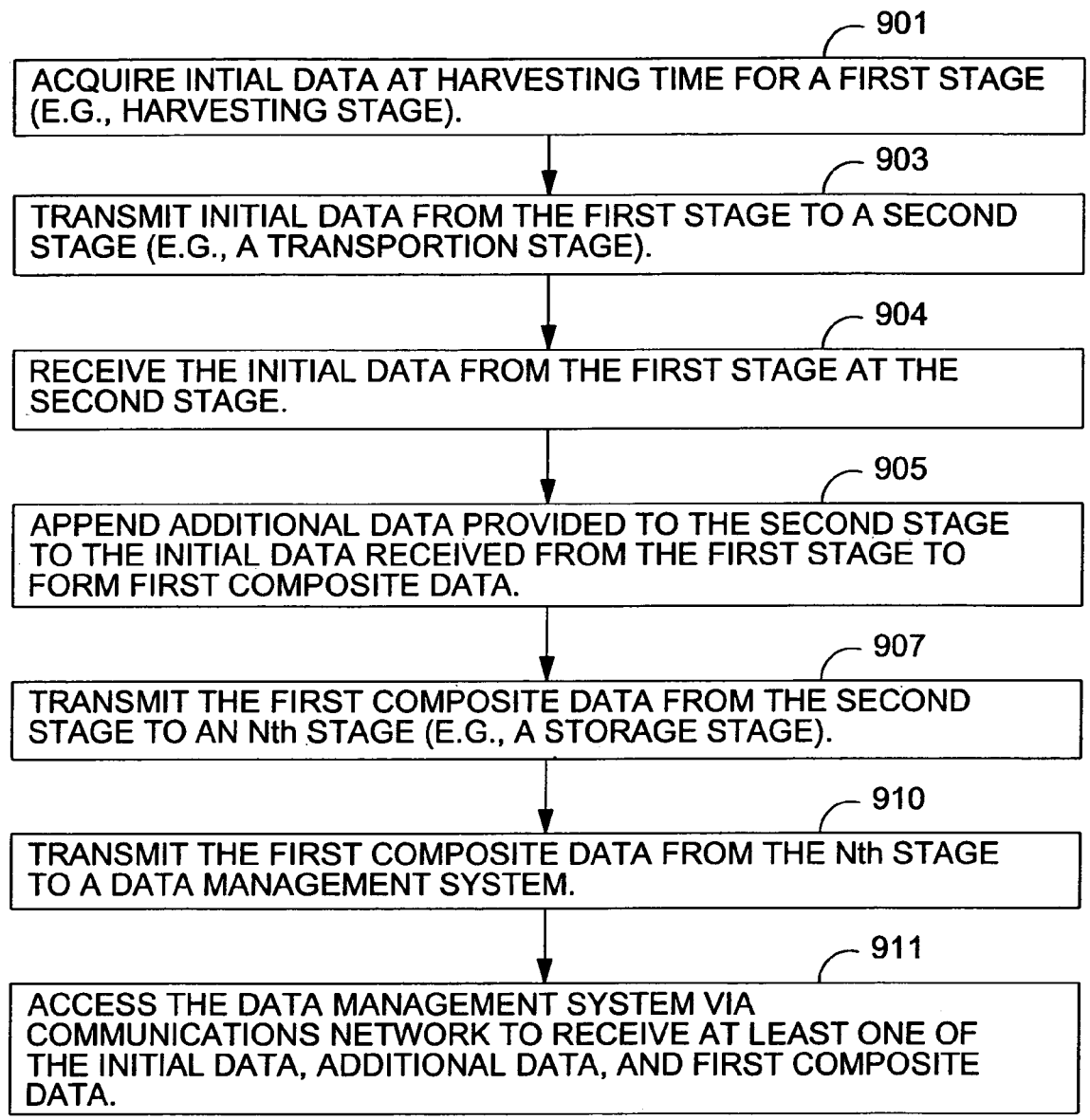
FIG. 2 is a flow chart of one embodiment of a method for tracking the identity of an agricultural product in conformance with FIG. 1.

FIG. 2 is flow chart of a method for tracking product information of an agricultural product or a derivative thereof. The method of FIG. 2 starts in step 901.

In step 901, initial data is acquired at a harvesting time for a first stage (e.g., a harvesting stage). For example, the initial data acquisition system 118 acquires initial data prior, during or after harvesting. Initial data comprises any of the following: harvesting data, machine data, crop attribute data, and any other data related to the production or characteristics of the agricultural product or a derivative thereof.

In step 903, initial data is transmitted from the first stage to a second stage (e.g., a transportation stage). For example, the initial transmitter 302 transmits additional data from the initial transmitter 302 to the intermediate receiver 305 via a wireless communication. The initial data acquisition system 18 and the initial transmitter 302 may be associated with a harvester or combine or another agricultural machine as previously described herein. The intermediate receiver 305 may be associated with a vehicle, a cart, a trailer, a barge, an aircraft, a ship, a vessel or another mobile transport mechanism for transporting the agricultural product or a derivative thereof between any of an origination location, an intermediate location, and a destination location. The mobile transport mechanism associated with the second stage equipment 352 is at least momentarily within communications range or sufficient geographic proximity to the first stage equipment 351 to permit establishing communications on a point-to-point basis or via a repeater or relay station.

In step 904, the initial data is received from the first stage at the second stage. For example, the intermediate receiver 305 receives the initial data and forwards the initial data to the intermediate data processing system 311 for data processing.

In step 905, additional data is appended under the second stage to the initial data received from the first stage to form first composite data. Additional data may be associated with one of the locations and the reading time. The additional data includes one or more of the following: a status indicator, a location identifier, a custodian identifier, a transaction identifier, a temporal descriptor associated with the status, location, custodian or transaction, an origination location, an origination time, an origination date, an origination custodian, an intermediate location, an intermediate time, an intermediate date, an intermediate custodian, a destination location, a destination time, a destination date, and a destination custodian. The custodian identifier represents the identity of a custodian who is in possession of the container 10 at the time of reading the container 10.

The intermediate data processing system 311 may gather and process data in accordance with several alternate techniques. Under a first technique pursuant to step 905, a user interface 309 is adapted to provide additional data for input into the intermediate data processing system 311. The user interface 309 may comprise a keyboard, a key, a switch or a logic circuit that is activated by the reader 19 reading the container 10 or tag 12 associated with the container 10. The user may enter additional data such as a custody identifier of the custodian in possession of the container 10, a location of the container 10, a time of scanning or reading the tag 12, a date of scanning or reading the tag 12 or other information. Other information may include product characteristic data, such as crop attribute data, harvesting data, transport data, storage data, and temporal data.

Under a second technique pursuant to step 905, a data generator 308 generates the additional data rather than requiring the user to enter data manually into a keyboard or another user interface. The generator 308 may generate additional data including one or more of the following: a custodian identifier of the custodian in possession of the container 10, a location of the container 10, a time of scanning or reading the tag 12, a date of scanning or reading the tag 12, product characteristic data (e.g., crop attribute data), harvesting data, transport data, storage data, a location of the second stage equipment 352, geographical coordinates of the second stage equipment, and temporal data. The temporal data may include a time stamp, a date stamp, or both, for example.

In step 907, the composite data (e.g., first composite data) is transmitted from the second stage to a next stage until the Nth stage is reached. The composite data is designated as first composite data for the second stage, second composite data for the third stage and Mth composite data for the Nth stage, where M equals 1 subtracted from N, where N is any whole number greater than two. For example, where N equals 3, the Nth stage represents the third stage and the Mth stage represents the second stage.

In step 910, the first composite data is transmitted from the Nth stage (e.g., the third stage) to a data management system 30. The reporting data processing system 313 may transmit a container identifier and the additional data for storage in a data management system 30. The container identifier and the additional data may be transmitted via a communications network 28 to a data management system 30.

In step 911, the data management system 30 is accessed via communications network 28 to make available to a user at least one of the initial data, the additional data, and the composite data (e.g., first composite data). During step 911, the data management system may organize a report that is made available for a user in accordance with several alternate embodiments, that may be executed individually or cumulatively.

Under a first technique for organizing a report for a user pursuant to step 911, the product-flow description comprises a chain of custody for the agricultural product or a derivative thereof. In general, the chain of custody represents a chain of possession of one or more custodians who possess the agricultural product or a derivative of thereof from (1) an origination location to a destination location or (2) from the origination location to any intermediate location between the destination location and the intermediate location or (3) from the intermediate location to the destination location or (4) from the origination location to the destination location via one or more intermediate locations. As used herein, a custodian refers to a person or business entity that possesses, controls or did possess or control the agricultural product or a derivative thereof.

The chain of custody may be defined by a sequential list of custodians (e.g., an origination custodian, the intermediate custodian, and the destination custodian). For example, a chain of custody may include an origination custodian and an associated origination date, and an origination time during which the origination custodian had possession of the container 10 and the agricultural product. The chain of custody may also include an intermediate custodian associated with the possession of the container 10 at an intermediate time and an intermediate date. Further, the chain of custody may include a destination custodian associated with possession of the container 10 at a destination time and a destination date. The custodian identifiers may be associated with one or more locations of where the container 10 and the agricultural product were located at the time when the corresponding custodian had possession or custody of the agricultural product. The chain of custody may be determined based upon the container 10 identifier 22 and the corresponding additional data for sequential reading times.

In addition to a sequence of custodians and corresponding temporal data (e.g., time and date of possession stamps), the chain of custody may track activities that the container 10 or its contents experience. For example, the activities may include loading of the agricultural product into the container 10, transport of the container 10, storage of the container 10, unloading of the agricultural product from the container 10, processing (e.g., refrigeration, heating, washing, cleaning) of the container 10, and processing (e.g., vacuum sealing, drying, heating or refrigeration) the agricultural product or contents within the container 10.

Under a second technique for organizing a report for a user pursuant to step 911, the product-flow description comprises a historical travel path of the agricultural product or a derivative thereof. The historical travel path of the container 10 and the agricultural products that it holds may be tracked. The travel path may include an origination location, one or more intermediate locations, and a destination location. Further, the travel path may include a time and a corresponding date of arrival, departure, or both, for each location. The travel path may include planned intermediate locations and planned destination locations that the container 10 and its contents have not yet reached. The travel path may extend from a grower or harvester to the consumer. A user may reroute, redirect or revise the travel path of the container 10 to meet a delivery requirement or to fulfill a contract on a timely basis or some other reason, for example.

Under a third technique for organizing a report for a user pursuant to step 911, the product-flow description maintains historical records of previous historical travel paths of the container 10 in addition to a present historical path of the container 10. For example, one load of an agricultural product will be removed from the container 10 and the container 10 will be re-used for another load of the same type (e.g., substantially similar or the same genetic composition) of agricultural product or a different type of agricultural product. A respective agricultural product (e.g., a respective product identifier) is assigned to a container identifier for a limited period, duration of time or a defined time span during which the container 10 holds or contains the agricultural product. The container 10 may be emptied, cleaned, and reassigned to another agricultural product for a subsequent limited period or duration of time. The historical assignments of agricultural products, corresponding container identifiers, and corresponding dates and times are stored even after the agricultural product is removed or unloaded from the container 10. Accordingly, if the present load of a first container 10 is contaminated by another agricultural product, the previous historical travel path of the first container 10 may be retrieved to identify the possible source of the contamination as a prior load in the first container 10 or a product that was at the same location and time in another container 10 (e.g., a second container 10) outside of the first container 10.

The product-flow description or the chain of custody establish the validity duration for the assignment of a container identifier to an agricultural product. An electronically-readable tag 12 may be re-set after each use to a different container identifier. Alternately, the tag may go through a cycle of different container identifiers to facilitate differentiating the different agricultural products. Likewise, the optically-readable tag may be changed after each use of the container 10 for an agricultural product to avoid confusion. However, if the optically-readable or electronically-readable tag is not updated with respect to the container identifier, the validity duration of the association of the container identifier with the product may be gleaned from the duration between the origination date and the destination date. Further, the time period may be determined with reference to an origination time on the origination date and the destination time on the destination date.

Under a fourth technique for execution of step 911, the product-flow description comprises records of each handling transaction or exchange of custody as an agricultural product or a derivative thereof is moved in commerce. As the agricultural product is taken from the harvester to the processor, each handling transaction or exchange of custody of the product is tracked. The tracking is conducted on a cumulative basis so that the stored information includes historic handling information and current handling information. Handling information may comprise a handler identifier (e.g., a custodian identifier), a handling date, a handling time, and a handling location. A product-flow description (e.g., a product flow map) may be represented as a map of the handling that an agricultural product receives from a harvesting time until a consumption time.

Under a fifth technique for organizing a report for a user pursuant to step 911, the product-flow description comprises one or more product flow maps between or among different supply chain members or between an origination site (e.g., harvesting site) and a destination site (e.g., retailer site or consumer site). The product flow map may be represented in textual, graphical, tabular, or another format.

The product flow map may be generated (a) for each leg of a supply chain between different supply chain members or (b) on a geographic point-to-point basis between supply chain members. For instance, at the same time or after the product is placed in a storage destination (e.g., a primary storage destination), a first product flow map is generated from the harvesting site or origination site to the storage destination. A second product flow map may be generated from the storage destination to the processor site. A third product flow map may be generated from the processor and to a distributor, wholesaler, retailer, consumer or another party. The first product flow map, the second product flow map, the third product flow map or another product flow map facilitates tracking the product and derivatives thereof to assist in verification of the integrity of the delivered product and derivatives thereof.

In one embodiment, the product flow map may include an agricultural product that is traced through its transformation into a derivative product and its corresponding attributes. Accordingly, a product flow map may include a product identifier, a first derivative product identifier through an nth derivative product identifier, where n is any whole number equal to or greater than two. The product flow map further includes product attributes for each corresponding derivative product and identifier. For example, the agricultural product of corn may be transformed into the derivative product of corn flour, and further transformed into a baked good or another derivative product for human consumption. Another illustrative transformation would be the production of a pharmaceutical compound or derivative product from the agricultural product of genetically engineered corn that has been modified to produce certain proteins, antibodies, pharmaceutical precursors, chemicals or other components of medicinal treatment.

Figure 3:
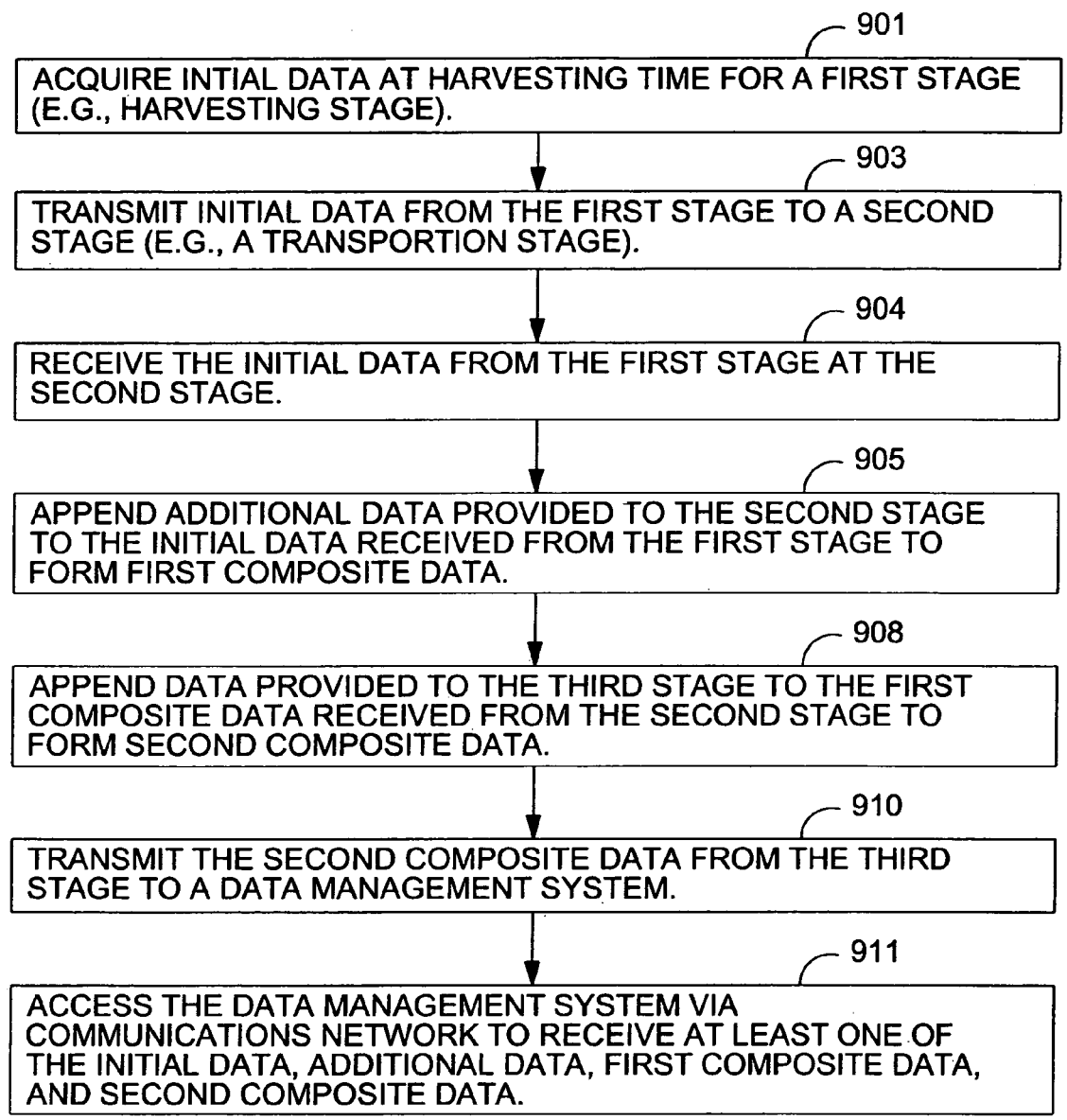
FIG. 3 is a flow chart of another embodiment of a method for tracking the identity of an agricultural product in conformance with FIG. 1.

FIG. 3 is flow chart of a method for tracking product information of an agricultural product or a derivative thereof. The method of FIG. 3 is similar to the method of FIG. 2 except the method of FIG. 3 further includes step 908 following step 907 and prior to step 910. Like reference numbers in FIG. 2 and FIG. 3 indicate like elements.

In step 908, data is appended under the third stage to the first composite data to form second composite data.

Figure 4A:
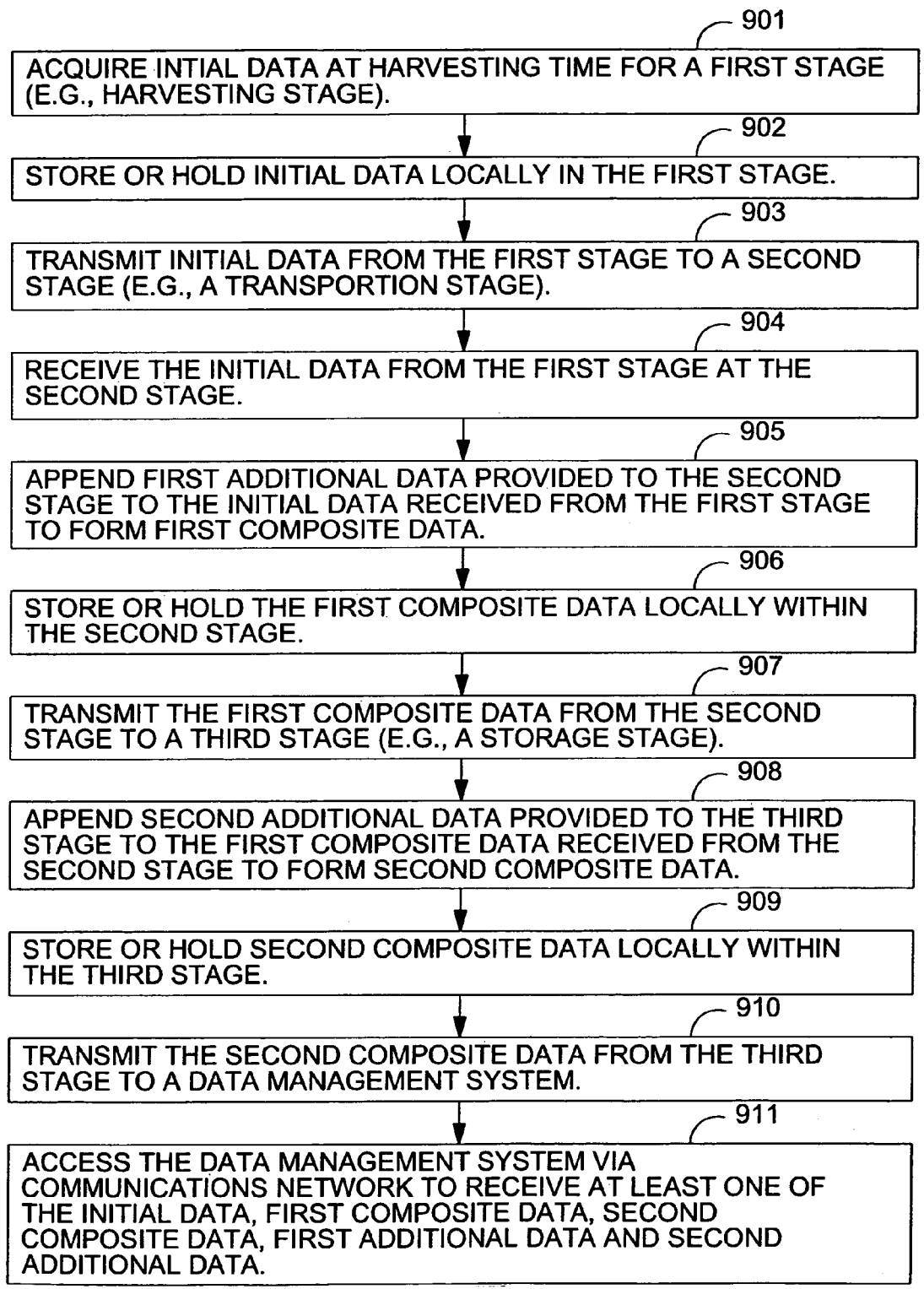
FIG. 4A is a flow chart of a method for tracking the identity of an agricultural product.

The method of FIG. 4A is similar to the method of FIG. 3, except the method of FIG. 4A includes additional steps 902, 906, 909. Like reference numbers in FIG. 3 and FIG. 4A indicate like elements.

In step 902, initial data is stored or held locally in the first stage, rather than being stored in the data management system 30.

In step 906, the first composite data is stored or locally held in the second stage, rather than being stored in the data management system 30.

In step 909, second composite data is stored or locally held within the third stage, rather than being stored in the data management system 30.

Figure 5B:
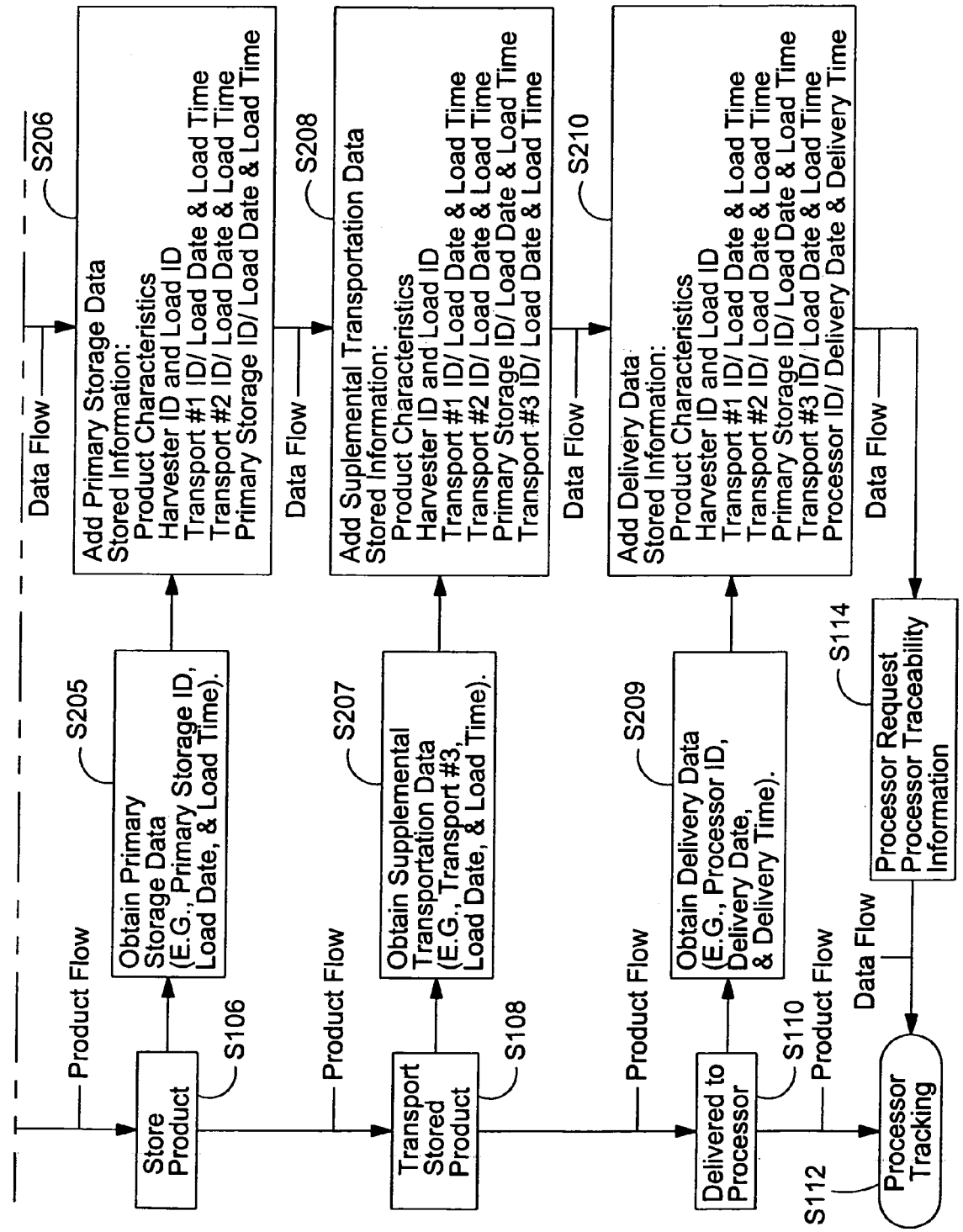
FIG. 5 is a flow chart of product information tracked from a harvesting time to a processing time.

FIG. 5 is a block diagram of a flow chart for product information tracked from a harvesting time to a processing time. The grower typically has possession of the product at the harvesting time, whereas the processor typically has possession of the product at the processing time. The method of FIG. 5 illustrates the flow of the product through a supply-chain and a corresponding flow of information which is associated with different transactions between supply-chain members. A supply chain member is any person or entity that holds title, possession, or an economic interest in the agricultural product or a derivative thereof. For example, supply chain members may include, but need not include, a grower, a distributor, a wholesaler, a retailer, a shipper, a storer, and a processor. As illustrated in FIG. 5, the supply chain members include one or more of the following: a grower that harvests the product, a first transport member that transports the product, a second transport member that transports the product, a storage member that stores the product, a third transport member that transports the stored product, and a processor that processes the transported product.

In any of steps S102, S104, S106, S108, and S110 of FIG. 5, a person or a member associated with the supply chain may scan the container 10 in which the harvested agricultural product or any derivative thereof is contained. As the tag 12 is scanned or afterwards, acquired additional information is affiliated with the tag 12 for storage in the data storage of each successive equipment stage. The additional information may originate from user input from a member of the supply chain into the data input device 16 (e.g., user interface 309 or the data generator 308). In the case of the user interface 309, the member of the supply chain is able to enter into custom information or other information for tracking or tracing the downstream flow of the product from the grower to the processor. In the case of the data generator 308, a user may activate the generator 308 by reading the tag 12. Accordingly, the data generator 308 may generate a pre-defined or pre-programmed data entry for association with the tag 12 identifier scanned from reading a container 10 that contains the product.

The method of FIG. 5 begins with harvesting of the product in step S100. For example, a harvester, combine or another machine harvests the agricultural product in step S100. In step S199, before, during or after harvesting of an agricultural product, harvesting data is gathered or otherwise obtained for storage. The harvesting data may comprise one or more of the following: a harvesting time, a harvesting date, crop attribute, product characteristics, moisture content, yield, harvested weight, harvester data, and load identifier. A producer has the opportunity to monitor the quality of an agricultural product during the harvesting process or otherwise.

In one embodiment, the product characteristics may represent characteristics that are sensed by sensors associated with or incorporated into a harvesting machine or combine. The sensors of the harvesting machine may create harvesting data that is associated with a load identifier, a date, a time, and a product identifier. The product characteristics may include the moisture level of the crop, the weight of the crop, the oil content of the crop, the nutritional value of the crop or other information.

In an alternate embodiment, a grower may enter product characteristics into a user interface associated with the initial data acquisition system 18. The grower or another user may enter product characteristics into a data input device 18 of the initial data acquisition system 18 to complement machine-generated product characteristics, to alter machine-generated product characteristics or otherwise.

In step S200, the obtained harvesting data is stored in the initial data storage 301 of the first stage equipment 351, in the data storage of a downstream component, or both. A downstream component is a device associated with any stage that follows the initial stage (e.g., harvesting stage). For example, a downstream component includes intermediate data storage 310 of the second stage equipment 352. The information stored in the initial data storage 301 may be affiliated with a tag identifier (e.g., a container identifier) associated with a container 10 in which the agricultural product or any derivative thereof is stored or placed. The initial data storage 301 is physically (e.g., geographically, electrically and electromagnetically) separate from, or otherwise distinct from, any data storage of a central data repository (e.g., data management system 30).

In step S102, the first transporter receives the container 10 from the grower or an agent thereof after the product was harvested during step S100. Step S201 may occur simultaneously with or after reception of the container 10 in step S102. In step S201, the first transport identifier, the load date, and the load time are entered into a user interface 309 of a data input device 16 by a user, gathered automatically by a data input device 16, generated by a data generator 308 or otherwise obtained by a data input device 16. For example, the first transport identifier is entered by a first transporter into a keyboard of a user interface of the data input device 16, whereas the time and date are generated by a clock or timer of the data input device 16. The data input device 16 may comprise an optical scanner, a data generator 308, a keypad, a keyboard, a switch or any other device for inputting data. In step S202, the first transporter adds the first transport identifier, the load date, and the load time to the stored information (e.g., locally stored information) associated with the received container 10 in the intermediate data storage 310 of the second stage equipment 352, in the data storage of a downstream component with respect to the second stage equipment 352, or both. The intermediate data storage 310 is physically (e.g., geographically) separate from, or otherwise distinct from, any data storage of a central data repository (e.g., data management system 30).

In step S104, the second transporter receives the container 10 from the first transporter or an agent thereof. Step S203 may occur simultaneously with or after the reception of the container 10 in step S104. In step S203, the second transport member identifier, the load date and the load time are entered into a user interface 309 of a data input device 16 by a user, gathered automatically by a data input device 16, generated by a data generator 308 or otherwise obtained by a data input device 16. In step S204, the second transporter adds the second transport member identifier, the load date, and the load time to the stored information in the intermediate data storage 310 of the intermediate stage equipment 352 or in an downstream component therefrom. The intermediate data storage 310 is physically and geographically separate from, or otherwise distinct from, any data storage of a central data repository (e.g., data management system 30).

In step S106, the storage member receives the stored product from the second transporter or another transporter. Step S205 may occur simultaneously with or after the reception of the container 10 in step S106. In step S205, the primary storage identifier, the load date, and the load time are entered into a user interface 309 of a data input device 16 by a user, gathered automatically by a data input device 16, generated by a data generator 308 or otherwise obtained by a data input device 16. In step S206, the storage member adds the primary storage identifier, the load date, and the load time to the stored information (e.g., locally stored information) for storage in the intermediate data storage 310 of the intermediate stage equipment 352, in the data storage of a downstream component with respect to the intermediate stage equipment 352, or both.

In step S108, the third transporter receives the container 10 from the storage member. Step S207 may occur simultaneously with or after the reception of the container 10 in step S108. In step S207, the third transport member identifier, the load date, and the load time are entered into a user interface 309 of a data input device 16 by a user, gathered automatically by a data input device 16, generated by a data generator 308 or otherwise obtained by a data input device 16. In step S208, the third transport member adds the third transport member identifier, the delivery date, and the delivery time to the stored information (e.g., locally stored information) for storage in the data storage (e.g., intermediate data storage 310) of intermediate stage equipment 352, in the data storage of a downstream component with respect to the intermediate stage equipment 352, or both. The data storage or intermediate data storage 310 used pursuant to step S208 is physically and geographically separate from any data storage of a central data repository (e.g., data management system 30).

In step S110, the processor receives the container 10 from the third transporter or another transporter. Step S209 may occur simultaneously with or after the reception of the container 10 in step S110. In step S209, the processor identifier, the load date and time are entered into a user interface 309 of a data input device 16 by a user, gathered automatically by a data input device 16, generated by a data generator 308 or otherwise obtained by a data input device 16. In step S210, the processor adds the processor identifier, delivery date, and delivery time to the stored information for storage in the data storage (e.g., intermediate data storage 310) of intermediate stage equipment 352, in the data storage of a downstream component with respect to the intermediate stage equipment 352, or both. The data storage or intermediate data storage 310 used pursuant to step S210 is physically and geographically separate from any data storage of a central data repository (e.g., data management system 30).

In step S114, the processor requests any of the stored information to verify one or more of the following: a product-flow description of a product or a derivative thereof, product traceability of a product or a derivative thereof, the identity or genuiness of a genetic composition of a product or a derivative thereof, the chain of custody of the product, and the chain of custody of the product or a derivative thereof from the grower to the processor. For example, the processor may have a subscriber data processing system 32, a user terminal 601 or a subscriber terminal 32 that accesses the stored information to confirm the chain of custody of a particular agricultural product or a derivative thereof with a particular tag 12 identifier of a container 10.

Figure 6B:
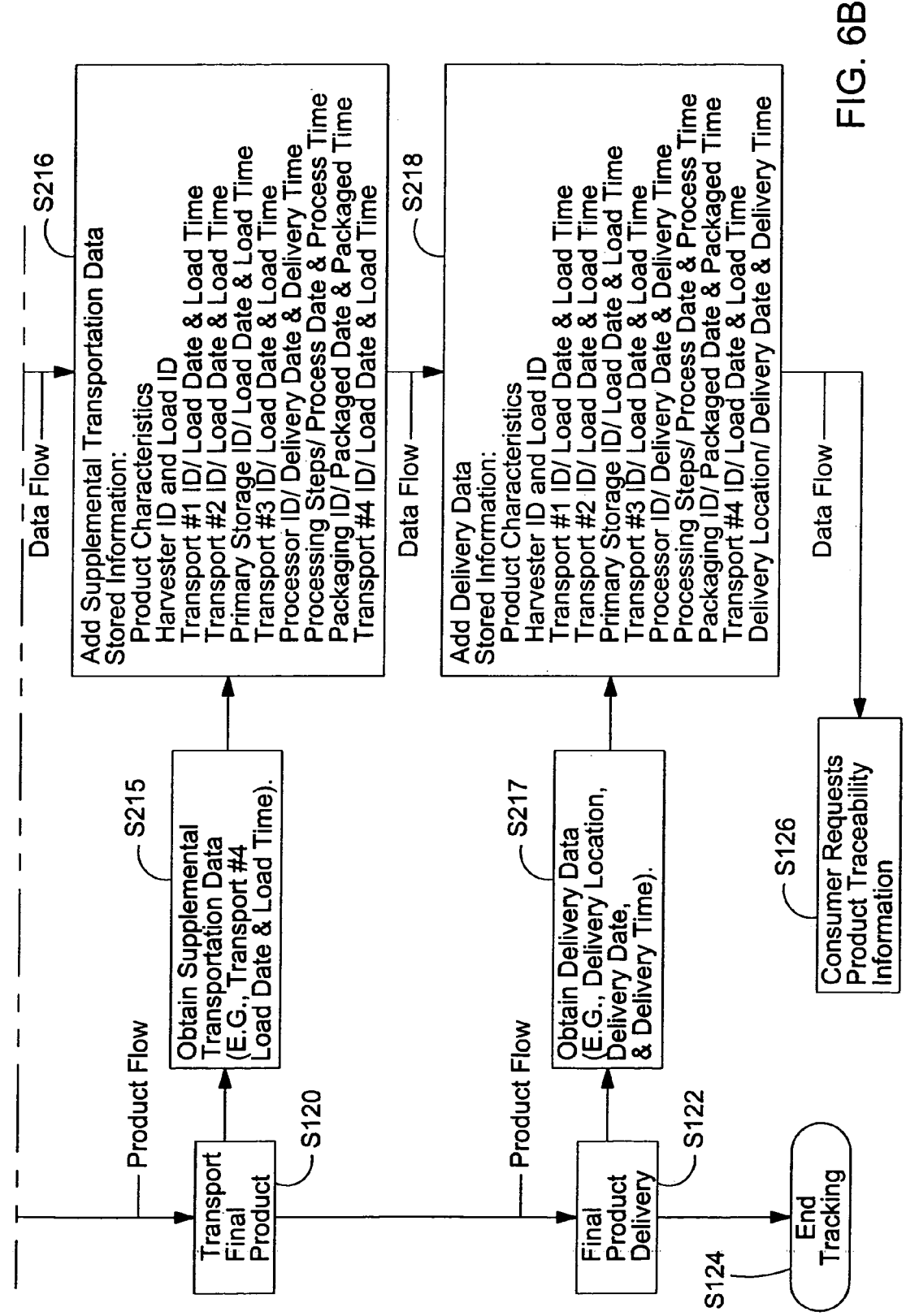
FIG. 6 is a flow chart of product information tracked from a processing time to a consumption time.

The method of FIG. 6 is similar to the method of FIG. 5, except the method of FIG. 6 tracks product information from a processing time to a consumer. The processing time is associated with a processor, whereas the consumption time is associated with a consumer. The method of FIG. 6 may follow, but does not need to follow, the method of FIG. 5. The method of FIG. 6 begins in step S116, which may follow product processing of step S112.

The product-flow description extends from the processor through to a consumer. The members of the supply chain of FIG. 6 include one or more of the following: a final processor, a packager, and a fourth transporter.

In step S116, the final processor receives the container 10 from the processor or another party. Step S211 may occur simultaneously with or after the reception of the container 10 in step S116. In step S211, final processing data are entered into a user interface 309 of a data input device 16 by a user, gathered automatically by a data input device 16, generated by a data generator 308 or otherwise obtained by a data input device 16. In step S212, the final processor supplements the stored information by adding final processing data to the stored information for storage in the intermediate data storage of an intermediate stage equipment, in the data storage of a downstream component with respect to the data management system 30, or both. The final processing data may include one or more of the following: processor identifier, final processor identifier, delivery date, delivery time, the delivery date to the processor, the delivery time to the processor, the delivery date from the processor, the delivery time from the processor, processing steps, processing identifiers, processing parameters, processing date, and processing time.

In step S118, the packing operation receives the container 10 or the agricultural product within the container 10 from the final processor. Step S213 may occur simultaneously with, or after the reception of, the container 10 in step S118. In step S213, packaging data are entered into a user interface 309 of a data input device 16 by a user, gathered automatically by a data input device 16, generated by a data generator 308, or otherwise obtained by a data input device 16. In step S214, the packing operation adds packaging data to the stored information (e.g., locally stored information) in the intermediate data storage. For example, the packing operation adds packaging data including a packaging identifier, a packaging date, and a packaging time. The intermediate data storage 310 used pursuant to step S214 is physically and geographically separate from any data storage of a central data repository (e.g., data management system 30).

In step S120, the fourth transporter receives the packaged product from the packer or packing operation. Step S215 may occur simultaneously with or after the reception of the container 10 in step S120. In step S215, a fourth transport identifier, a load date, and a load time are entered into a user interface 309 of a data input device 16 by a user, gathered automatically by a data input device 16, generated by a data generator 308 or otherwise obtained by a data input device 16. In step S216, the fourth transporter supplements the stored information (e.g., locally stored information) by adding a fourth transport identifier, a load date, and a load time to the stored information (e.g., locally stored information) for storage in the intermediate data storage 310, in the data storage of a downstream component with respect to the intermediate stage equipment 352, or both. The intermediate data storage 310 used pursuant to step S216 is physically and geographically separate from any data storage of a central data repository (e.g., data management system 30).

In step S122, the distributor, wholesaler, retailer, consumer or another receiving member of the distribution chain receives the packaged product from the fourth transporter or an agent thereof. The receiving member (e.g., the consumer) is associated with a delivery location and a delivery date and time. Step S217 may occur simultaneously with or after the reception of the container 10 in step S122. In step S217, delivery information, as further defined below, is entered into a user interface 309 of a data input device 16 by a user, gathered automatically by a data input device 16, generated by a data generator 308 or otherwise obtained by a data input device 16. In step S218, the receiving member of the distribution chain adds delivery data to the stored information stored in the data storage of a reporting data processing system 313, in the data storage of a upstream component with respect to the data management system 30, or both. For example, the delivery information may include the delivery location, delivery time, and delivery date associated with the transfer or exchange of the transported product between the fourth transporter (or his agent) and the receiving member. If a delivery is received by or made by a retailer, the delivery information may further comprise a retailer identifier.

In step S126, the consumer or user may represent a subscriber to a data processing system 30 such that the consumer can request the product traceability data developed from the processor to the retailer. The user may access the data stored within or associated with the data processing system via at least one of the user terminal 601, subscriber data processing system 32, and the subscriber terminal 32. The consumer may use the product traceability information to verify the contents of a product or a derivative thereof. For example, the consumer may verify that the products do not contain allergens or other ingredients that may cause an unwanted side effect or physical reaction or medical reaction to the consumption of the product. In addition, the consumer may merely want to verify or confirm the source or contents of the product so that the consumer may purchase or obtain product that is consistent with the consumer's preferences. For example, a consumer may have a preference for a particular variety of vegetable or an organically-grown vegetable or fruit. In one embodiment, the stored information and information appended thereto in any of the steps of FIG. 5 and FIG. 6 is arranged in a standardized format.

Figure 7:
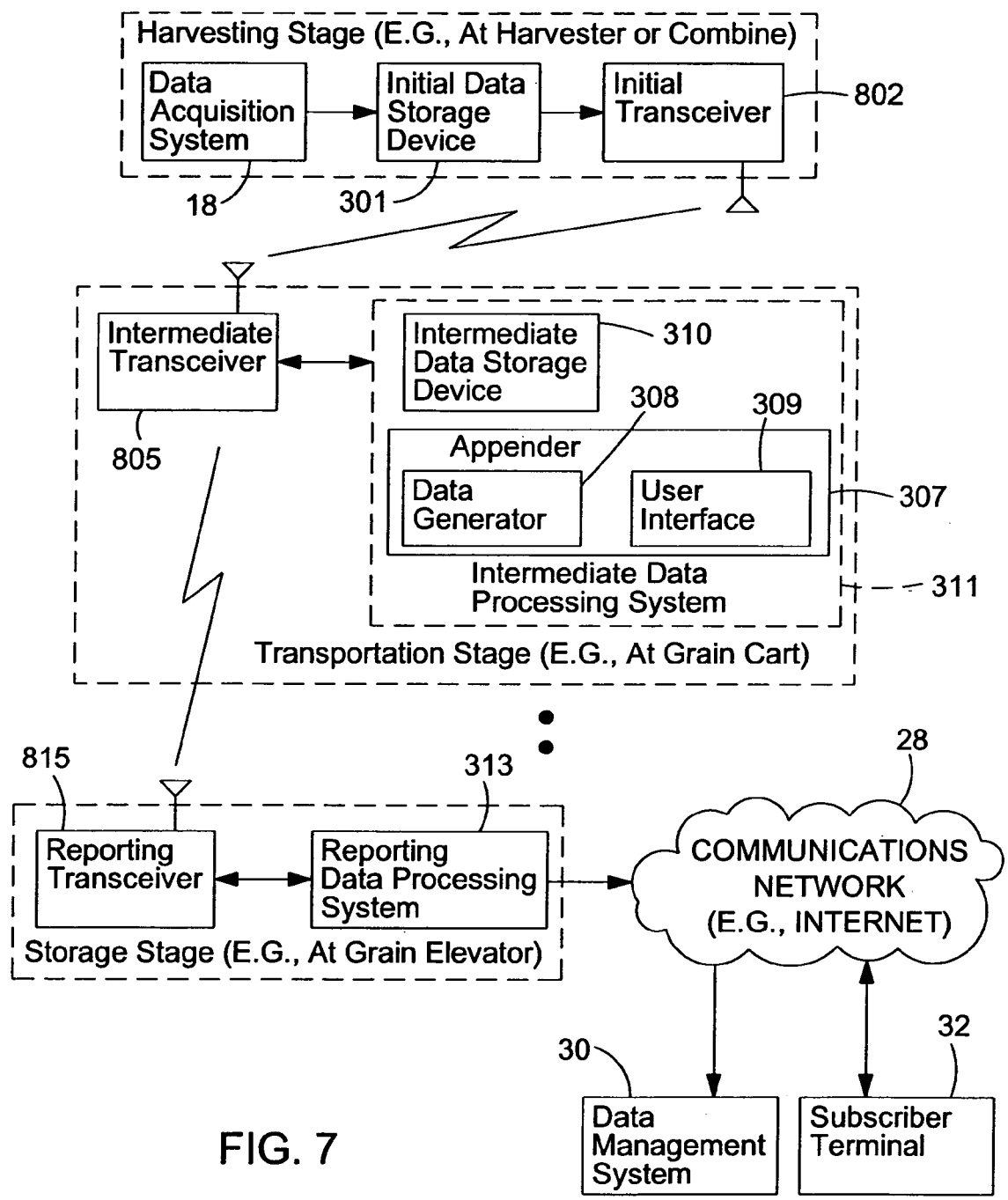
FIG. 7 is a block diagram for an alternate embodiment for tracking the identity of an agricultural product.

FIG. 7 is an alternate embodiment of a system for tracking the identity of an agricultural crop or a derivative thereof. The system of FIG. 7 is similar to the system of FIG. 1 except the system of FIG. 7 replaces transmitters and receivers of FIG. 1 with transceivers. Like reference numbers in FIG. 1 and FIG. 7 indicate like elements. The transceivers of FIG. 7 allow the two-way flow of data, such that after data is sent from a transmitting transceiver to a receiving transceiver, the receiving transceiver can acknowledge receipt of the information, engage in error checking, request a resend, and/or undertake various security measures (e.g., spread spectrum frequency hopping, dynamic coding or assignment of code division multiple access codes). Accordingly, the transceivers facilitate reliable and secure communications between the various stages.

The first stage includes an initial transceiver 802; the second stage or an intermediate stage includes an intermediate transceiver 805; and the Nth stage includes a reporting transceiver 815. The initial transceiver 902 communicates with the intermediate receiver 805 via an electromagnetic signal (e.g., a radio frequency communication.) The intermediate transceiver 805 communicates with the reporting transceiver 815 via an electromagnetic signal (e.g., a radio frequency communication).

Figure 8:
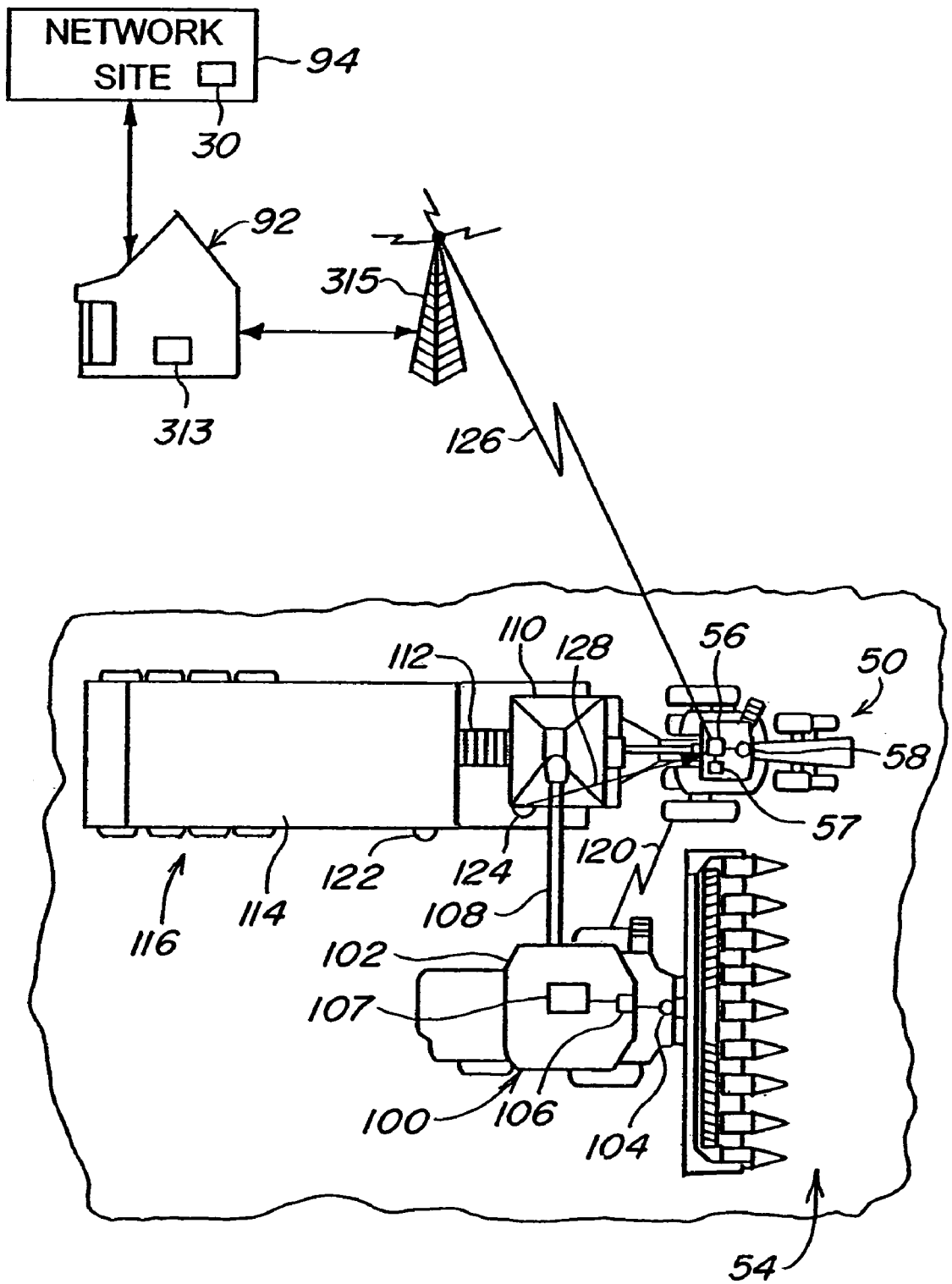
FIG. 8 is a schematic illustration of information collection during a harvesting operation.

As shown in FIG. 8, the grain is unloaded from a combine 100 to a hopper 110. The grain tank 102 of the combine 100 is emptied via an unloading auger 108, a conveyer belt or via another conveyance system. From the hopper 110, a conveyor 112 transfers the crop to a freight container 114. The freight container 114 is an illustrative embodiment of the container 10. The hopper 110 and conveyor 112 are part of a container cart 116 used to transport the container 114 through the field 54. The tractor 50 tows the container cart. Exemplary container carts are shown in U.S. patent application Ser. No. 09/969,203 filed Oct. 1, 2001, assigned to the assignee of the present application and hereby incorporated by reference.

As the grain tank 102 is unloaded, the harvesting information stored in the combine computer 106 is transmitted wirelessly to the tractor computer 56 on the tractor 50 as shown by the arrow 120. The combine computer 106 and the tractor computer 56 are generally homologous to the initial data acquisition system 18 and the intermediate data processing system 311, respectively. Further, the combine computer 106 supports at least the equivalent functionality of the initial data acquisition system 18, whereas the tractor computer 56 supports at least the equivalent functionality of the intermediate data acquisition system 118 and the intermediate data processing system 311.

The combine computer 106 is coupled to a first wireless communications device 107. The combination of the combine computer 106 and the first wireless communications device 107 is homologous to the first stage equipment 351 of FIG. 1 and the combination provides generally equivalent functionality to the first stage equipment 351. The tractor computer 56 is coupled to a second wireless communications device 57. The combination of the tractor computer 56 and the second wireless communications device 57 is homologous to the second stage equipment 352 of FIG. 1 and the combination provides generally equivalent functionality to the second stage equipment 352 as previously described herein.

The first wireless communications device 107 may comprise the initial transmitter 302, the initial transceiver 802 or the combination of a transmitter and a receiver, for example. Similarly, the second wireless communications device 57 may comprise the intermediate receiver 305, the intermediate transceiver 805 or the combination of the intermediate receiver 305 and the intermediate transmitter 306, for example. The first wireless communications device 107 and the second communications device 57 are capable of communicating with each other directly via an electromagnetic signal (e.g., radio frequency signal) or via a repeater or a wireless communications network.

Any type of suitable wireless data transfer method can be used to transfer agricultural production data on an agricultural product between the combine computer 106 and the tractor computer 56. Where multiple combines and tractors are operating in the same field, Global Positioning System (GPS) location information from both the combine 100 and the tractor 50 ensure that the tractor receives production information (e.g., harvest information) from the same combine from which the crop is received. The combine 100 and tractor 50 are associated with a corresponding combine location-determining receiver 58 (e.g., GPS receivers with differential correction) and a tractor location-determining receiver 104, respectively. In one example, a combine-tractor pair, which transfers an agricultural product between the paired combine 100 and tractor 50 during harvesting, is identified by determining the closest geographic coordinates of all of the active combines and tractors in a field or determining the closest tracking or most highly correlated change in geographic coordinates and/or directional vectors over a minimum threshold time period. The location-determining receivers (58, 104) provide the geographic coordinates and vectors for determining the related combine-tractor pair.

The tag on the container 114 may comprise a Radio Frequency (RF) tag 122, for example. The RF tag 122 contains an identifier of the container 114. A reader 18 may comprise a radio frequency (RF) reader 124 on the container cart 116. The RF reader 124 queries the RF tag 122 and receives a response therefrom that includes the container identifier. The reader 124 is coupled to the tractor computer 56, either wirelessly or by wire, and transmits the container identifier as represented by the arrow 128. The reader 124 of the container cart 116, the tractor computer 56, and the second wireless communications device 57 of FIG. 8 are collectively, substantially homologous in structure and substantially analogous in function to the second stage equipment 352 of FIG. 1.

The agricultural production data (e.g., harvesting information) relating to the agricultural product deposited in the container 114, together with the container identifier, is transmitted wirelessly as shown by the signal 126 to the reporting receiver 315. The reporting receiver 315 may be associated with a data processing system 313 at the remote farm office 92 or elsewhere. The combination of the reporting receiver 315 and the data processing system 313 of FIG. 8 may represent an Nth stage equipment 353 of FIG. 1 or the substantial equivalent thereof.

The data processing system 313 at the remote farm office 92 may store and/or upload one or more of the following obtained data: the agricultural production data, container data, container identifier, initial data, ancillary data, and composite data. The data processing system 313 may transmit the obtained data to a network site 94, such as the data management system 30 via a communications network 28.

At the data processing system 313, the ancillary data or additional data may be added to a container identifier. For example, the harvesting information is combined with the planting and other production information based on the georeference location information. That is, the planting information for a given location is combined with the harvesting information for the same location. The combined planting information, harvesting information, other agricultural production information, and the container identifier form the composite data for the harvested agricultural product. The composite data may be associated with the container identifier for the container 114 as a reference or pointer to the remainder of the composite data for a particular agricultural product.

At the data processing system 313, other production information, including chemical application and mechanical soil treatments, both prior to and after planting, may be collected to add to the composite data. Weather information during the growing season can be collected from the Internet or by other means and added to the composite data at the farm office 92.

As shown and described with reference to FIG. 8, the harvesting information is transferred from the combine 100 to the tractor 50 pulling the container cart 116. Alternatively, the tractor computer 56 can be located on the container cart 116, or the combine computer 106 in conjunction with suitable wireless communications devices, could be used to receive, store, and transfer information to the farm office 92.

FIG. 8 illustrates the harvesting operation with the crop being loaded into a freight container 114 from the combine 100. Another practice that may fall within the scope of the invention is to discharge the crop from the combine into a grain cart for transport away from the field and deposit into a storage device.

Figure 9:
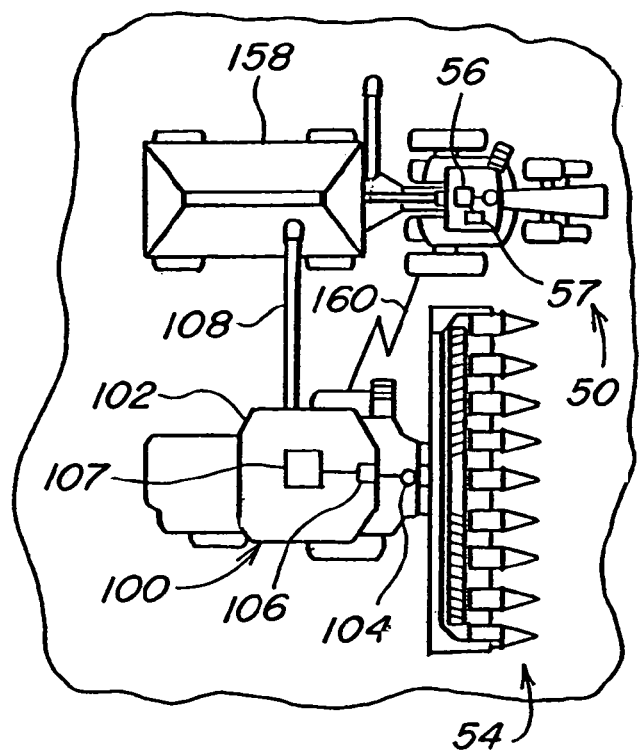
FIG. 9 is a plan view of a harvesting operation with a combine unloading into a grain cart.

The method and system of tracing an agricultural product can be used in such a harvesting operation as shown in FIG. 9. Like reference numbers in FIG. 8 and FIG. 9 indicate like elements. The agricultural production data (e.g., harvesting information) is transferred from the combine 100 to the tractor 50 pulling the grain cart 158 when the combine grain tank is unloaded. The line 160 represents the information transfer between the first wireless communications device 107 of the combine 100 and the second wireless communications device 57 the tractor 50. Accordingly, the agricultural production data gathered by the combine computer 106 is transmitted to the tractor computer 57 for holding until the agricultural production data and any container identifier is conveyed to the data processing system 313 or to another computer of another agricultural machine.

Figure 10:
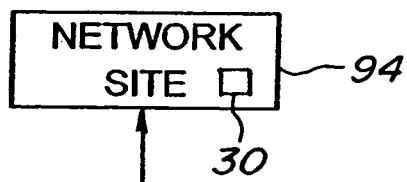
FIG. 10 is a schematic illustration of a harvesting operation with a container being loaded from a grain cart.
Figure 10:
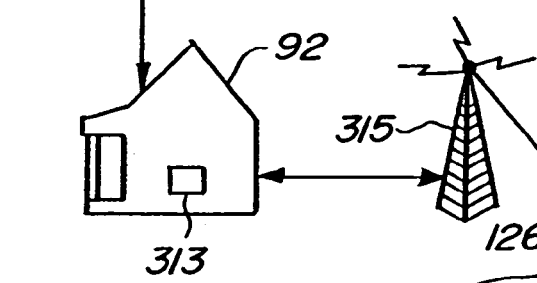
Figure 10:
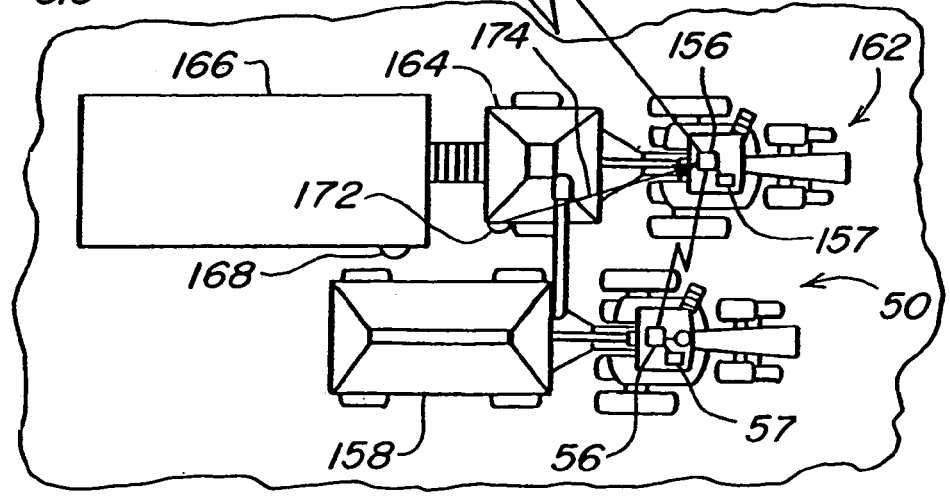

In the illustrative example of FIG. 10, when the grain cart 158 is unloaded or at another suitable time, the agricultural production information (e.g., harvesting information) may be transferred from the tractor computer 56 of tractor 50 to secondary tractor computer 156 of a tractor 162. Like reference numbers in FIG. 8, FIG. 9, and FIG. 10 indicate like elements. Tractor 162 is used to operate a container loader 164 that receives the crop from the grain cart 158 and loads the crop into a container 166. The container loader 164 is shown in more detail in U.S. patent application Ser. No. 09/970,235 filed Oct. 1, 2001, assigned to the assignee of the present application and hereby incorporated by reference. The container 166 has an RF tag 168 with a container identifier. The RF reader 172 on the loader 164 queries the RF tag 168. When the crop is transferred from the grain cart 158 to the container 166, the identifier of the container is captured and transmitted to the secondary tractor computer 156 as shown by arrow 174 for association with the collective data profile 12. The harvesting information is then transferred to the farm office 92 in the same manner as previously described. Each time the crop is transferred from one vessel to another, the time and location is recorded to enable association of the data profile with the container identifier of the container that ultimately receives the crop. Further, if the agricultural product is transferred between multiple containers during harvesting, the historical container list of container identifiers may be available as part of the composite data.

Although FIG. 10 shows the transfer of agricultural production data via secondary tractor computer 156, it will be appreciated that alternatively, the container identifier could be transmitted to the computer 56 on tractor 50 and from there, the harvest information is transferred to the data processing system (28,32) at the farm office 92.

The composite data can be stored and maintained at the farm office 92. The producer can use the data profile for farm management, to market the crop and/or to verify contract or certification compliance.

In a preferred embodiment of the invention, the composite data is stored and maintained by an information service provider that operates the network site 94. There, the data profile can be readily accessed through the network, such as the Internet, by the downstream processors and manufacturers. The processing and manufacturing information is easily added to the data profile 12 at the network site 94.

In any of the foregoing embodiments, a subscriber of the data management system 30 may pay a fee for accessing information about various containers, agricultural products associated with the containers or precursors of products. The subscriber may do a query based on a container identifier or other characteristics that are associated with the contents of the container at a particular time. The data management system 30 may store the data in a relational database or a table which includes one or more of the following fields: container identifiers, corresponding time stamps, container content data, and location data. In one embodiment, the data includes container identifiers and corresponding time stamps of the changes in contents of the container. The data may also include data on the location of the container that is associated with a time stamp so the user or subscriber can locate the container and route the container to meet business needs or other requirements on a real-time basis. If the chain of custody of the travel path of the ultimate product or a precursor of the ultimate product are known, the ultimate product may be associated with a higher product integrity and a lower contamination risk than would otherwise be possible. The harvested agricultural product may represent a precursor of the ultimate product, where the harvested agricultural product is processed, transformed or combined with other product inputs to produce the ultimate product. However, the harvested agricultural product may represent the ultimate product, where the harvested agricultural product is not processed or transformed.

The method and system supports the user's or subscriber's ability to use it as a tool to maintain and monitor the integrity of a product in relation to its handling processes. Traceability across the product-use chain (e.g., the food chain) and the offering of a tool to document, research, and remedy contamination of a commodity at each point in the product use or food chain. The system facilitates record-keeping of the handling of an agricultural product from the harvesting time to the consumption time or from the harvester to the consumer. The handling may be defined by a travel path of the agricultural product or a precursor thereto. If product handling processes are tracked, the processor or down-stream member of the supply chain may be able to rate the reliability of the handlers of the agricultural product to maintain adequate processes and control measures. Further, if all agricultural products are tracked for a handler at a given geographic location and time, cross-contamination of agricultural products at the handler are more readily identified.

For further aspects of the system and method described herein, refer to U.S. application Ser. No. 10/327,277, filed on Dec. 20, 2003 and U.S. Provisional Application No. 60/366,181, filed Mar. 20, 2002, which are incorporated herein by reference.

Having described one or more embodiments, it will become apparent that various modifications can be made without departing from the scope of the invention as defined in the accompanying claims.

The invention claimed is:

1. A method for tracing the identity of an agricultural product, the method comprising:

acquiring data on an agricultural product associated with a harvesting time to form initial data and acquiring container data via a reader for reading a tag associated with a stage;

storing the initial data in an initial data storage of a first stage of equipment that is physically separate from a data management system for providing reportable data on a product flow description of the agricultural product;

transmitting the initial data to an intermediate data processing system associated with a handler of the agricultural product and another stage, the intermediate data processing system being physically separate from the data management system as a central repository;

appending additional data to the initial data received at the intermediate data processing system to form composite data, the additional data including one or more of the following: an originating location, an origination time, an origination date, an origination custodian, an intermediate location, an intermediate time, an intermediate date, an intermediate custodian, a destination location, a destination time, a destination date, and a destination custodian, where the data associated with the agricultural product is cumulatively stored locally in intermediate data storage in the intermediate data processing system until transferred to a last stage, such that the information stored in the data storage of a preceding stage is a subset of the information from one or more later stages; and transmitting the composite data to at least one of a receiver and a reporting data processing system at the last stage for processing the composite data and transferring the processed data to the data management system, wherein the intermediate data processing system is separate from the reporting data processing system such that only the reporting data processing system communicates directly with the data management system via a communications network to report the cumulatively stored information within the composite data to the data management system to support a request for the stored information, and wherein the intermediate data storage is physically and geographically separate from any data storage of the central repository.

2. The method according to claim 1 wherein the transmitting of the initial data is associated with the first stage of handling of the agricultural product and wherein the transmitting of the composite data is associated with the last stage of handling the agricultural product.

3. The method according to claim 2 wherein the intermediate stage comprises a second stage, the second stage being associated with transportation of the agricultural product.

4. The method according to claim 2 further comprising an additional intermediate stage comprising a third stage, the third stage being associated with storage of the agricultural product.

5. The method according to claim 1 further comprising determining the additional data based on an identity of a handler.

6. The method according to claim 1 wherein the composite data represents a link in a chain of custody for the agricultural product for transport of the product from an origination location to a destination location.

7. The method according to claim 1 wherein the chain of custody is defined by a sequential list of custodians including at least one of an origination custodian, an intermediate custodian, and a destination custodian.

8. The method according to claim 1 further comprising:
providing product characteristics corresponding to the agricultural product to a recipient of the agricultural product associated with the destination location.

9. The method according to claim 1 further comprising:
providing chain-of-custody data on the chain of custody corresponding to the agricultural product to a recipient of the product associated with the destination location, the established chain of custody comprises a list of successive custodians of the product that had custody of the product at corresponding reading times for a product transported from the origination location to the destination location.

10. The method according to claim 1 further comprising:
accessing the data management system to trace the identity of an agricultural product received at a destination location.

11. A system of electronics equipment for tracing the identity of an agricultural product, the system comprising:
an initial acquisition system for acquiring data on an agricultural product associated with a harvesting time to form initial data and acquiring container data via a reader for reading a tag associated with a first stage;
an initial data storage for storing the initial data, the initial data storage being physically separate from a data management system for providing reportable data on a product flow description of the agricultural product;
an initial transmitter for transmitting the initial data to an intermediate data processing system associated with a handler of the agricultural product and another stage, the intermediate data processing system being physically separate from the data management system as a central repository;
a data manager, of the intermediate data processing system, adapted to append additional data comprising supplemental transportation data and delivery data to the initial data received at the intermediate data processing system to form composite data, the additional data comprising one or more of the following: an originating location, an origination time, an origination date, an origination custodian, an intermediate location, an intermediate time, an intermediate date, and an intermediate custodian, a destination location, a destination time, a destination date, and a destination custodian, where the data associated with the agricultural product is cumulatively stored locally in intermediate data storage in the intermediate data processing system until transferred to a last stage, such that the information stored in the data storage of a preceding stage is a subset of the information from one or more later stages; and
an intermediate transmitter for transmitting the composite data to at least one of a receiver and a reporting data processing system at the last stage for processing the composite data and transferring the processed data to the data management system, wherein the intermediate data processing system is separate from the reporting data processing system such that the reporting data processing system communicates with the data management system via a communications network to report the cumulatively stored information within the composite data to the data management system to support a request for the stored information, and wherein the intermediate data storage is physically and geographically separate from any data storage of the central repository.

12. The system according to claim 11 wherein the initial transmitter is associated with the first stage of handling of the agricultural product and wherein the intermediate transmitter is associated with the last stage of handling the agricultural product.

13. The system according to claim 12 wherein the intermediate stage comprises a second stage, the second stage being associated with transportation of the agricultural product.

14. The system according to claim 13 further comprising an additional intermediate stage comprising a third stage, the third stage being associated with storage of the agricultural product.

15. The system according to claim 11 wherein the composite data represents a link in a chain of custody for the agricultural product for transport of the product from an origination location to a destination location.

16. The system according to claim 11 further comprising:
a subscriber terminal capable of communicating with the data management system to retrieve chain-of-custody data corresponding to the agricultural product, the established chain of custody comprising a list of successive custodians of the product that had custody of the product at corresponding reading times for a product transported from the origination location to the destination location.

17. The system according to claim 11 wherein the chain of custody is defined by a sequential list of custodians including at least one of an origination custodian, an intermediate custodian, and a destination custodian.

18. The system according to claim 11 further comprising:
the data management system in communication with the reporting data processing system to trace the identity of an agricultural product received at a destination location.

19. A method for tracking product information from a processing to a consumer, the method comprising the steps of:
obtaining processing data associated with processing of a product into a final product or a derivative product;
storing the obtained processing data as locally stored information associated with a first intermediate data storage;
obtaining packaging data associated with the packaging of the derivative product or the final product; and
at a second intermediate data storage, adding the packaging data to the stored information from the first intermediate data storage, wherein the intermediate data storages are physically and geographically separate from any data storage of a central repository, where the data associated with the product is cumulatively stored locally in the second intermediate data storage until transferred to the data management system, such that the information stored in the data storage of a preceding stage is a subset of the information from one or more later stages and where a data reporting processing system supports communications between the second intermediate data storage and the central repository via a communications network;
obtaining supplemental transportation data;

adding the supplemental transportation data to the locally stored information in a second intermediate data storage;

obtaining delivery data;

adding delivery data to the locally stored information in the second intermediate data storage, where the second intermediate data storage is physically and geographically separate from any data storage of the central repository; and requesting the stored information to obtain at least one of the processing data and the packaging data.

20. The method according to claim 19 wherein the processing data comprises at least one of processing steps, process date, and process time and wherein the packaging data comprises at least one of packaging identifier, packaged date, and packaged time.

* * * * *